US012770117B1

(12) United States Patent
Patel et al.

(10) Patent No.: US 12,770,117 B1
(45) Date of Patent: Oct. 20, 2026

(54) ASSET REGULATION NETWORK

(71) Applicant: Block, Inc., Oakland, CA (US)

(72) Inventors: Disha Patel, New York, NY (US); Jung Yeon Ryu, Fremont, CA (US); Leyli Guliyeva, Brooklyn, NY (US); Rebecca Garner, Brooklyn, NY (US); Soren Iverson, Costa Mesa, CA (US)

(73) Assignee: Block, Inc., Oakland, CA (US)

( * ) Notice: Subject to any disclaimer, the term of this patent is extended or adjusted under 35 U.S.C. 154(b) by 100 days.

(21) Appl. No.: 18/194,469

(22) Filed: Mar. 31, 2023

(51) Int. Cl.
*G06Q 20/06* (2012.01)
*G06Q 20/10* (2012.01)
*G06Q 30/00* (2023.01)

(52) U.S. Cl.
CPC ......... *G06Q 20/065* (2013.01); *G06Q 20/108* (2013.01)

(58) Field of Classification Search
CPC ........................... G06Q 20/065; G06N 20/108
See application file for complete search history.

(56) References Cited

U.S. PATENT DOCUMENTS 4,615,681 A * 10/1986 Schwarz ............... A24F 15/005 131/270
5,903,879 A * 5/1999 Mitchell ................ G06Q 40/00 705/37
7,464,859 B1 * 12/2008 Hawkins ................ G06Q 40/00 235/382
7,610,245 B2 * 10/2009 Dent ...................... G06Q 30/04 708/106
9,330,415 B1 * 5/2016 Castleman ............. G06Q 40/10
9,760,871 B1 * 9/2017 Pourfallah ............. G06Q 10/10
9,928,490 B1 * 3/2018 Vancini .................. G06Q 20/10
9,934,493 B2 * 4/2018 Castinado ............ G06Q 20/108
9,990,613 B1 * 6/2018 Bhatt ..................... G06Q 20/26

(Continued)

FOREIGN PATENT DOCUMENTS

WO WO-2021146727 A1 * 7/2021 ........... G06Q 20/322

OTHER PUBLICATIONS

"Health Savings Custodial Agreement", Dec. 2011. Available at: https://www.mscu.net/hubfs/HSA%20Custodial%20Agreement/HSA%20Custodial%20Agreement.pdf (Year: 2011).*

(Continued)

*Primary Examiner* — John H. Holly
(74) *Attorney, Agent, or Firm* — Polsinelli PC

(57) ABSTRACT

Particular embodiments receive a request to access an amount of the funds comprising a restricted balance associated with a restricted account of a user if a payment service prior to satisfaction of a condition associated with the restricted account. The condition, upon satisfaction, allows the restricted balance to transition to an unrestricted balance. The payment service causes an intervention to be displayed by a user device of the user that prevents access to the funds in the restricted balance. In lieu of accessing the funds in the restricted balance, the payment service automatically causes an amount of funds to be transferred to an unrestricted account of the user. The payment service withdraws, from the restricted balance, an amount of funds equal to the amount of funds transferred to the unrestricted account unless one or more conditions associated with the transfer to the unrestricted account of the user are satisfied.

20 Claims, 18 Drawing Sheets

(56) References Cited

U.S. PATENT DOCUMENTS

| | | | | |
|---|---|---|---|---|
| 10,163,153 | B1 * | 12/2018 | Constantine | G06Q 40/00 |
| 10,275,827 | B2 * | 4/2019 | McCarthy | G06Q 40/02 |
| 10,354,246 | B1 * | 7/2019 | Janiga | G07F 19/204 |
| 10,366,386 | B2 * | 7/2019 | Prabhu | G06Q 20/3674 |
| 10,395,247 | B2 * | 8/2019 | Gilliam, III | G06Q 20/385 |
| 10,510,082 | B1 * | 12/2019 | Zimmerman | G06Q 20/108 |
| 10,621,561 | B1 * | 4/2020 | Brock | G06Q 20/381 |
| 10,817,853 | B1 * | 10/2020 | Brock | G06Q 20/02 |
| 10,909,525 | B1 * | 2/2021 | Dhodapkar | G06Q 20/3278 |
| 10,984,446 | B1 * | 4/2021 | Becker | G06N 20/00 |
| 11,023,873 | B1 * | 6/2021 | Grassadonia | G06Q 40/03 |
| 11,086,643 | B1 * | 8/2021 | Sharma | G06N 3/088 |
| 11,544,695 | B2 * | 1/2023 | Bodalia | G06Q 20/223 |
| 11,893,555 | B1 * | 2/2024 | Bowers | G06Q 20/403 |
| 2007/0294167 | A1 * | 12/2007 | Stanley | G06Q 40/00 705/42 |
| 2009/0048957 | A1 * | 2/2009 | Celano | G06Q 40/06 705/35 |
| 2013/0325599 | A1 * | 12/2013 | Yeri | G06Q 40/02 705/14.49 |
| 2015/0019401 | A1 * | 1/2015 | Kollur | G06Q 40/03 705/38 |
| 2015/0032595 | A1 * | 1/2015 | Koo | G06Q 40/04 705/37 |
| 2015/0120337 | A1 * | 4/2015 | Spalding | G06Q 40/08 705/4 |
| 2017/0178135 | A1 * | 6/2017 | Bull | G06Q 20/40 |
| 2018/0060843 | A1 * | 3/2018 | Maheshwari | G06Q 20/3224 |
| 2018/0240192 | A1 * | 8/2018 | Castineiras | G06Q 40/06 |
| 2019/0034889 | A1 * | 1/2019 | Brock | G06Q 20/20 |
| 2019/0325442 | A1 * | 10/2019 | Norman | G06Q 20/3223 |
| 2019/0355063 | A1 * | 11/2019 | Probetts | G06F 3/04847 |
| 2020/0349648 | A1 * | 11/2020 | Cosmano | G06Q 40/06 |
| 2021/0133894 | A1 * | 5/2021 | Reses | G06N 20/00 |
| 2022/0005036 | A1 * | 1/2022 | Reses | G06Q 20/405 |
| 2022/0005115 | A1 * | 1/2022 | San Martin | G06F 9/451 |
| 2022/0036450 | A1 * | 2/2022 | Sanghvi | G06Q 20/22 |
| 2022/0076230 | A1 * | 3/2022 | Grassadonia | G06Q 40/02 |
| 2022/0391873 | A1 * | 12/2022 | Suresh | G06Q 20/3674 |
| 2023/0045946 | A1 * | 2/2023 | Duane | G06Q 20/065 |
| 2023/0046919 | A1 * | 2/2023 | Dhodapkar | G06Q 20/3674 |
| 2023/0088840 | A1 * | 3/2023 | Rudraraju | G06Q 20/4016 705/43 |
| 2023/0222581 | A1 * | 7/2023 | Halperin | G06N 20/00 705/37 |
| 2023/0237582 | A1 * | 7/2023 | Probetts | G06Q 40/06 705/36 R |
| 2023/0351496 | A1 * | 11/2023 | Ruble | G06Q 40/03 |
| 2024/0265355 | A1 * | 8/2024 | McCabe | G06Q 40/04 |

OTHER PUBLICATIONS

"Don't Pledge Your IRA For Any Loans", May 2013. Available at: https://irahelp.com/slottreport/dont-pledge-your-ira-any-loans/#:~:text=However%2C%20if%20you%20have%20an,security%20for%20a%20personal%20loan (Year: 2013).*

"Coverdell Education Savings Account Disclosure Statement", 2022. Available at: https://www.dws.com/globalassets/cio/dam-US/pdfs/forms-and-application/ira-e70a.pdf?v=109951836 (Year: 2022).*

"Convenient Paperless Loans and Withdrawals", 2022, 3 pages. Available at: https://www.lincolnfinancial.com/public/microsite/pdf/Participant-guide-paperless-loans-withdrawals.pdf (Year: 2022).*

IP.Com NPL Search History.*

* cited by examiner

ASSET REGULATION NETWORK

TECHNICAL FIELD

Online services can permit users to create one or more accounts associated with or used to access the online service. Online services can further regulate user access to specified accounts and actions associated with those accounts. In some examples, an online service may provide and service a mobile application or other end user access point with a user interface (UI) configured to facilitate said access. Access to specific accounts associated with a user can be precluded or restricted based on conditions associated with those accounts.

DETAILED DESCRIPTION

Figure 1:
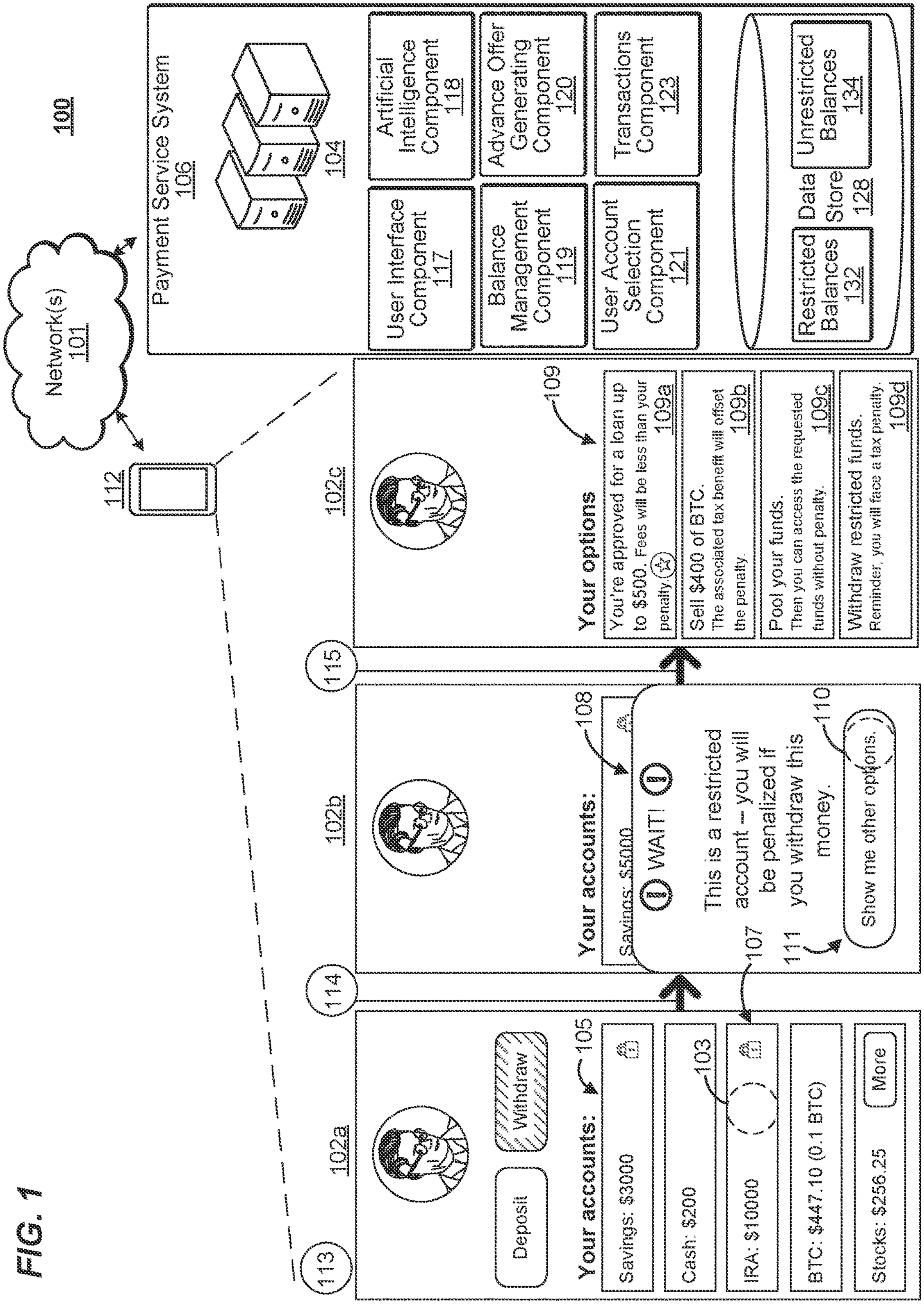
FIG. 1 is an example operating environment for processing user transaction requests according to embodiments disclosed herein.

Techniques for managing assets and associated states are described herein. Techniques described herein relate to assets associated with accounts of users on and with services, such as online services, and service providers and states associated with said accounts and assets. In an example, techniques described herein leverage a network of computing devices and/or components associated with a service provider. The service provider can enable users to manage assets (e.g., funds, accounts, balances, etc.) via such computing devices and/or components. In some examples, assets can correspond to funds, such as those stored in user accounts. Assets can be associated with states, such as a restricted state, an unrestricted state, or the like. For instance, in some examples where the assets under consideration include funds, certain types of funds, for example, associated with accounts for retirement planning, long-term investing, or other long-term financial planning have limits imposed to disincentivize accessing the funds saved therein for short-term use. In some examples, taxes on such assets are deferred (e.g., "tax deferred assets") and/or certain penalties may be imposed on a user who accesses such assets before a specified period of time has elapsed or the user has satisfied certain criteria. As such, such assets can be associated with a "restricted" state. User accounts can also be associated with similar access restrictions until a specified period of time has lapsed or the user, or account, has satisfied certain criteria.

Such accounts can also be associated with a "restricted" state, which may be applied to all assets associated with said accounts. Said accounts can be referred to as "restricted accounts." When assets are associated with an account, they may be stored, held, or otherwise recorded as being in association with a "balance" associated with said account. Balances can also be associated with a restricted or unrestricted state. When balances are associated with a restricted state, they can be referred to as "restricted balances." For example, a restricted account may include one or more of an external brokerage account, a money market account (MMA), an employer-sponsored retirement account, an individual retirement account (IRA), a heath savings account (HSA), a flexible savings account (FSA), an education savings account (ESA), or another tax-deferred account, among others. In some examples, funds associated with investing accounts, cryptocurrency accounts, savings accounts, or the like can be "restricted." Different types of restricted accounts can be associated with different types of restrictions that must be satisfied before the funds stored in the accounts can be accessed. Assets associated with "unrestricted" states can be assets that are accessible free of consequences or satisfaction of restrictions. Techniques described herein relate to the technical infrastructure for monitoring user activity in real-time or near-real-time and interrupting individual transactions to make actionable, personalized and/or customized recommendations to enable users to manage assets and associated states.

In some examples, the service provider can be a payment service system. The payment service system can provide payment services, among other services, via one or more server computing devices that are in communication with one or more instances of a payment service application installed on respective user devices. In some examples, the payment service system can provide one or more user interfaces, accessible, for example, through an installed instance of the payment service application, to enable users to manage assets using the payment service system. Techniques described herein can enable users to leverage the payment service system to access unrestricted assets, restricted assets, and/or the like and, in some examples, to change the asset type of specific assets from restricted assets to unrestricted assets or from unrestricted assets to restricted assets, move assets between asset types, or do the same with restrict accounts and unrestricted accounts.

Techniques described herein can leverage specially configured hardware or software components associated with a payment service (e.g., a "network" or "platform") to offer technical solutions to multiple technical problems identified in the field of providing online services, for example payment services, and in particular providing access regulation management to restricted assets, balances, and accounts in accordance with the description herein. For the purpose of this disclosure, unless specifically noted otherwise, operations attributed to the payment service can be performed by a payment service system comprising one or more computing devices and functional components of which are described below.

Existing systems related to providing access regulation management lack access to a centralized data store that enables access to multiple user accounts, balances, and/or or types of assets associated with a particular user. Moreover, existing systems are not capable of integration across systems to even provide visibility of a given user's multiple accounts, balances, or types of assets distributed across multiple online services. As an example, in existing systems, a user must establish multiple independent accounts with multiple service providers, respectively. Because service providers are typically not compatible across services, the systems operated by the service providers are not afforded visibility regarding the existence of the user's other independent accounts, let alone into the user's activity using those account. In contrast, techniques described herein enable a user to manage multiple accounts, balances, and assets with a single system operated by the service provider. The user can further manage the status of the same (e.g., restricted, unrestricted, and the like) with the service provider. Because of the singular system, the user can review and analyze the activity and status of their multiple accounts from a single system. That is, techniques described herein provide system-level insights and/or benefits that are not available with conventional techniques and/or existing systems.

In some examples, the payment service system can utilize a system-level view of users, user accounts, user activity, and the like to interrupt transactions affecting restricted assets and/or to recommend alternative options. A system-level view can take into consideration a user's past actions with and on the payment service system through one or more user devices as well as a user's pending requests or current actions. As an example, the payment service system can detect a user considering the use of or attempting to use funds in a restricted balance of a restricted account (e.g., a user requesting to withdraw funds from a retirement account or other similar restricted account) and interrupt the request. The interruption can recommend, to the user, reconsideration for incurring the penalties associated with the restricted account. As an example, the payment service system can interrupt the transaction with an offer—provided in real-time or near-real-time, while the transaction is pending—to advance funds (e.g., via a loan, cash advance, deferred payment, or the like) to an unrestricted balance of an unrestricted account of the user to cover the user's short-term needs with repayment terms for the funds advance customized to the user.

In some examples, such interruptions, recommendations, and/or offers can be based on rules and/or intelligence (e.g., artificial intelligence, machine learning, etc.). In some examples, when based on intelligence, relevant models can be trained on system-level data to optimize when, how, and what to recommend. In at least one example, one or more artificial intelligence components may be trained to interpret signals based on or associated with characteristics of a user, the status of the user's restricted and unrestricted accounts, transactional history information of and with the user, the user's overall financial health, and related data. In particular, the artificial intelligence component may be trained to interpret signals such as the amount requested to be transferred out of a restricted balance associated with a restricted account, funds available in other accounts owned by the user, including restricted and unrestricted balances (e.g., savings, checking, investment accounts), the potential penalty (or other regulatory requirements) associated with the requested transfer, and/or predicted and actual flow of funds into and out of restricted and unrestricted balances associated with the user's restricted and unrestricted accounts, respectively. In some examples, training data used to train such models can comprise data associated with a plurality of different users of the payment service system, a subset of different users, or individual users. This can enable differentiated levels of personalization and/or customization for actionable recommendations output by the models.

In some examples, based on these signals, the one or more machine learning models may be trained to generate an on-demand (e.g., in real-time or near real-time) funds advance offer with suggested repayment terms that will encourage the user to keep funds in the restricted balance of the restricted account. In some examples, the repayment terms of the funds advance may be generated such that withdrawing funds from the restricted account, and incurring the associated penalties, is the less attractive option. By using an artificial intelligence component trained to generate personalized and/or customized terms for funds advances, the payment service system is able to generate customized, actionable recommendations in real-time or near real-time as a user initiates a request (and is interrupted). This real-time operation improves the speed with which users are able to receive funds as needed while simultaneously making offers that are useful and likely to be accepted. In some examples, the advance can be executed automatically in lieu of execution of the request to withdraw funds from the restricted account.

In some examples, the payment service system may additionally or alternatively recommend the user withdraw funds from other unrestricted balances associated with their account in lieu of either withdrawing funds from the restricted balance or accepting a funds advance offer. As an example, the payment service system may access information such as most recent tax data to evaluate the impact of liquidating assets such as cryptocurrency or securities on the user's overall financial situation. One or more artificial intelligence components may be trained to evaluate the user's non-fiat holdings (e.g., security assets, cryptocurrency, etc.), tax information associated with those holdings (e.g., date of purchase, length of time held, value gained or lost) and generate a recommendation for whether the user can liquidate those assets to access funds in an unrestricted balance in lieu of incurring penalties from withdrawing funds from a restricted balance. In some examples, such information can be availed by system-level insights, for example, when users utilize the payment service system for tax services, storage and/or management of assets, In existing systems, assets associated with restrictions can be inaccessible until a condition is satisfied and/or can be associated with a penalty if such assets are accessed prior to satisfaction of the condition. In some examples, the infrastructure of the payment service system described herein can enable users to access funds associated with a restricted state, at least temporarily, even when associated condition(s) are not satisfied (and without penalty). For instance, in some examples, the payment service system may use a ledger system to organize, store, and record the restricted and unrestricted balances associated with the many users of the payment service system. In some examples, the ledger system may enable the payment service system to pool funds deposited by multiple users in respective restricted accounts. That is, when multiple users each deposit funds for a restricted account, the payment service system can allocate restricted assets to each of the multiple users using the ledger system described herein. That is, in some examples, when a user places funds into their restricted account, the payment service system may record this deposit as the user buying a stake in the pooled fund or otherwise being entitled to ownership of a portion of the pooled fund.

In some examples, restricted assets can be owned by the payment service system and entitlement to access the restricted assets by individual users can be denoted in a ledger. That is, the payment service system can treat the pooled fund as a large source of funding for saving or investing. In some examples, the pooled funds can be associated with a restricted state. In some examples, assets (e.g., investments) acquired using the pooled fund, or benefits of those assets, can be allocated to individual users who have placed funds into the same type of restricted account or have contributed to the pooled fund. The allocation of the assets can be determined at user request or can be determined automatically based on, for example, individual user risk tolerance, saving goals, other user information and so forth. In some examples, the asset allocation can be determined, for example, utilizing one or more artificial intelligence components trained to interpret signals such as those discussed previously as well as demographic information, expressed or inferred risk tolerance or goals, and other factors relevant to a user's holistic financial profile.

In at least one example, when a user requests access to funds that are otherwise denoted as restricted in the ledger system, the payment service system can utilize the ledger system to enable the user to access funds that are associated with an unrestricted state. In some examples, the funds can be pulled from another pool of funds or account associated with an unrestricted state, so the funds associated with the restricted state are not accessed at the time of the request (and a penalty is not assessed or incurred). In some examples, the other pool of funds or account associated with an unrestricted state can be an account managed and/or owned by the payment service system. In such examples, a portion of later received deposits (e.g., direct deposits, tax refunds, peer-to-peer payments, etc.) can be withheld or transferred to the source of the funds provided to the user. That is, the ledger system can be used to enable the user to access funds that would otherwise be restricted-when they need it-without incurring a penalty. In some examples, if the later deposits do not repay the amount provided to the user, the funds can be pulled from the restricted funds, at which point a penalty would be assessed or incurred.

In some examples, the ledger system can facilitate the transfer of ownership of assets internally and without requiring interaction with external systems. This expedites the processing speed of said transactions at least because there is no additional latency introduced through waiting for the response of external systems or delay introduced through waiting for said transactions to settle. The use of the ledger system further increases the security of transactions (including transfers of assets and account management operations, among others) conducted through the payment service system as potentially sensitive or private information is not transferred to third party external services, which increases the risk of malicious capture or incidental release.

In an example, existing systems related to providing access regulation management are not capable of real-time or near real-time monitoring of transaction requests and intervention of select transactions. For example, with existing systems, a request to access an account may require requesting and accessing information provided by a third-party. The request cannot be processed or analyzed until that information is received. This delays the apparent response time to the request for the end user. If a service provider were to decide to intervene in the request, the service provider may likewise be required to initiate multiple additional requests (and wait for responses to the requests) based on information received from the user (e.g., in the transaction request) and from the other services. In contrast, using techniques described herein, a service provider analyzes and begins to process an initial request without interaction with third-party systems. The service provider is further about to analyze whether any interventions, interruptions, or recommendations are applicable to the transaction request and present the same in real-time response to the transaction request from the user. Taken together, these capabilities conserve network resources by reducing the number of requests and responses sent between the payment service system and the instance of the payment service application that initiated the transaction request.

As another example, many current recommendation systems, are only able to be provided on a standardized basis. First, as described above, existing systems are not interoperable and therefore lack visibility of a user's restricted or unrestricted accounts, balances, or assets. Second, existing systems are only able to provide generalized advice regarding accessing restricted assets, such as generally recommending against incurring penalties as a result of accessing the restricted assets when the applicable conditions are not satisfied. In contrast, the service provider practicing techniques described herein is able to provide dynamic and personalized interventions and recommendations in real-time for a user in response to a transaction request. Interventions, which may also be referred to as interruptions, actionable recommendations, or the like, and which can be user interface affordances shown to the user to prevent a particular action and/or suggest a particular action can be customized based on the status of the user's account, balances, and assets.

Additionally, recommendations, which may be included within the displayed interventions, can be personalized to the user based on the user's transaction history through a payment service system, overall financial health, personal preferences (stated or inferred), and a myriad other factors. The generation of these recommendations can be performed in real-time or near real-time through the application of intelligence (e.g., machine-learning models and the like) trained to generate recommendations based on the precise information available to the payment service system. This personalization increases the relevance of the interventions and recommendations to individual users, increases the likelihood that the user will accept one of the recommendations, and increases the efficiency of the payment service system because specialized computing devices can be used which are designed to efficiently handle intelligence-based model recommendations and model training.

The techniques usable by online service providers, including payment services, use specialized hardware configured to perform the described operations in real-time or near real-time and while interacting with many users concurrently. The specialized hardware and processing techniques described herein are therefore integral to the performance of the techniques described herein. As will be appreciated, the operations require cooperation of multiple discrete components and data stores together in order to efficiently handle requests in a manner and timeliness that is expected of modern online services. Therefore, practically speaking, the techniques described herein cannot be performed by humans or by a single device acting alone.

This disclosure contemplates numerous transactions among restricted balances and unrestricted balances associated with restricted accounts and unrestricted accounts owned or held by, in various combination, an individual user, multiple users of a payment service system, or the payment service system itself. It is noted that, for brevity, all transactions described herein may not necessarily include all steps of performing the transaction. All described transactions are to be performed in compliance with the governing regulations and laws of the jurisdictions in which those transactions are performed.

FIG. 1 illustrates an example operating environment for processing user payment requests and performing payment transactions as discussed herein. The example environment 100 may include a payment service system 106. The payment service system 106 may include one or more servers 104 and a datastore 128 that are configured to exchange electronic communications through network(s) 101 with one or more other computing devices. For example, the server(s) 104 or datastore 128 may exchange electronic communications with at least one of a user device 112 associated with one or more users by way of a payment service application (e.g., a mobile payment and investment application) executing on the user device 112.

The payment service application can be a respective instance of the payment service application provided by a payment service operating the payment service system 106 and executing on the particular user device 112. The payment service can be associated with the payment service system 106 such that operations described as being performed by the payment service can be performed by the payment service system 106. In some examples, the payment service system 106 may include a "backend" and the payment service application can be referred to as a "client" or "frontend." In some examples, individual of the components described herein may include a "frontend" and other components may include a "backend." In general, the components described herein as performing operations can be combined or divided, can have different names or functions, be used alone or in combination, be implemented by the server(s) 104 or user devices, and so on.

As discussed above, the one or more users may send a request to the payment service system 106 through the payment service application executing on the user device 112. For example, the payment service application may display a user interface 102 (e.g., 102*a*, 102*b*, 102*c*, or the like) on the user device 112. Using the user interface 102, the user may request funds, payment, or a transfer of funds from one or more balances, including restricted balances 132 or unrestricted balances 134 recorded in one or more data stores 128 of the payment service system 106. The request and associated payee details may be received by a user interface component 117 of the payment service system 106.

Upon receiving the request and associated details from the user, the user interface component 117 may coordinate with a balance management component 119 and user account selection component 121 to retrieve user restricted balances 132 and/or unrestricted balances 134 as stored by the one or more data stores 128. For example, the balance management component 119 may supervise and manage the user account balances including restricted balances 132 and unrestricted balances 134 as discussed in greater detail below. In some examples, the user account selection component 121 may be utilized to select and route user requests, payments, or transfers of funds to the appropriate one of the restricted balances 132 and unrestricted balances 134 based on, for example, transaction amount, transaction type (e.g., fiat currency vs. cryptocurrency), and/or funds accessibility (e.g., restricted vs. unrestricted, mature assets vs. immature assets, and so forth) as discussed in greater detail below. In some examples, the one or more data stores 128 may include, for example, one or more internal databases that may be utilized to store information (e.g., user transaction history data, user purchase history data, user attribute data, user credit history data, user investment profile data, user investment data, user contextual data, user interaction data, user preference data, and so forth) associated with the user.

In some examples, the one or more data stores 128 may store, for example, user account balances including restricted balances 132 and unrestricted balances 134 owned by the one or more users and maintained by the payment service system 106. In some examples, the user account balances including restricted balances 132 and unrestricted balances 134 may be supervised and managed by balance management component 119. The balance management component 119 may maintain real-time or near real-time accurate records of the respective balances of the many users of the payment service system 106 as transactions are conducted. The balance management component 119 may further manage the restrictions associated with the restricted balances 132 to ensure that any associated regulations, laws, and other requirements are adhered to.

In some examples, the payment service system 106 may be a hosting and servicing platform for the user interface (e.g., of the mobile payment and investment application) executing on the user device 112. For example, in some examples, as further depicted by FIG. 1, the user interface (e.g., of the mobile payment and investment application) may include, for example, a user interface 102*a* for the user to interact with the payment service system 106 suitable for facilitating user access to restricted funds in accordance the presently disclosed embodiments. User interfaces 102*a*-102*c* are various example user interfaces which may be displayed by the user device 112 according to embodiments disclosed herein. In some examples, the user may request to access an amount of the funds associated with a restricted balance 132 prior to any satisfaction of a condition associated with the restricted balances 132. In some examples, the user interface component 117 may receive a request from the user device 112 to specifically access the restricted balance 132 and provide the request to the balance management component 119.

In some examples, the user interface component 117 may receive a request to access any funds of the user restricted balance 132 or unrestricted balance 132. The request may be provided to the balance management component 119, which evaluates the available unrestricted balance 134 to determine if the request can be satisfied using the unrestricted balance 132 alone. If not, the balance management component 119 can interpret the request as a request to access the restricted balance 132. In some examples, the restricted balances 132 may be associated with a restricted account, and may include one or more of an external brokerage account, a money market account (MMA), an employer-sponsored retirement account, an individual retirement account (IRA), a heath savings account (HSA), a flexible savings account (FSA), an education savings account (ESA), or other tax-deferred account. In some examples, while the payment service system 106 may store a real-time or near real-time ledger of the restricted balances 132, one or more of the restricted balances 132 may be managed and secured by one or more third-party platforms 130 (e.g., third-party financial institution) based on information provided to the third-party platforms 130 by the payment service system 106.

As a non-limiting example of the foregoing, a displayed sequence of user interfaces 102*a*, 102*b*, and 102*c* begins at user interface sequence step 113, in which the user may request to access funds IRA funds totaling $10000 as displayed by user interface 102*a*. For example, as indicated in user interface 102*a*, the user has selected a "Withdraw" interface. The user may be viewing the user interface 102*a* in the payment service application executing on their user device 112. The user interface 102*a* displays a listing of the user's accounts 105 to facilitate making a withdrawal from one of the accounts 105. The user's accounts 105 include the restricted accounts (denoted here with a lock icon as an example only and not by way of limitation) "Savings" totaling $3000 and "IRA" totaling $10000, and unrestricted accounts "Cash" totaling $200, "BTC" totaling $447.10, and "Stocks" totaling $256.25. In some examples, the user may select via user selection 103 of an affordance 107 corresponding to a restricted user account. The user selection 103 of the affordance 107 indicates the user's intent to withdraw currency from the corresponding account, which in the illustrated example is the account labeled "IRA," a restricted account. The associated balance of the restricted account may include a restricted balance 132. Upon receiving the user selection 103 of the affordance 107 corresponding to a restricted user account at user interface sequence step 113, the payment service application may send the selection to the user interface component 117, which forwards the request to the balance management component 119. The balance management component 119 may retrieve information associated with the restricted user account, including any applicable conditions, evaluate whether the conditions associated with the restricted balance 132 are satisfied, and, if not, may determine any applicable penalties that may be assessed against the user should the user withdraw the associated funds.

In some examples, including the illustrated example at user interface sequence step 114, the balance management component 119 may inform the user interface component 117 of the unsatisfied conditions and potential penalties. Because accessing the restricted balance associated with the restricted user account may incur penalties, the user interface component 117 of the payment service system 106 may then cause the request to be interrupted, for example, via a user intervention 108 (e.g., a pop-up, overlay, notification, widget, new user interface, etc.) (at user interface sequence step 114) that can be displayed by the user interface executing on the user device 112, shown here as user interface 102*b*. In some examples, the user intervention 108 may include a notification or similar intervention (e.g., "Funds Unavailable"; "Funds Restricted for 'X' period of time"; "Transaction Declined"; "Transaction Not Completed"; and the like) that prevents access to the funds corresponding to a restricted balances 132 as displayed by user interface 102*b*. In some examples, the user intervention 108 may include a statement of consequences of accessing the funds, such as the penalties that would be imposed by the transaction. In additional or alternative examples, the user intervention 108 may include a notification widget, which may include a message reminding the user of their previously indicated short-term or long-term savings goals, an educational booklet (e.g., user interface or series of user interfaces), or other functionality. In some examples, the user intervention 108 can include an affordance 111 that enables the user to view other options, as described below.

Additionally, while the present examples illustrate a process in which the user interface 102*b* may display the user intervention 108 in response to a user selection 103 of the affordance 107 corresponding to a restricted user account, in other examples, in response to a user selection 103 of the affordance 107 corresponding to a restricted user account, the user interface component 117 may forgo causing the user intervention 108 to be displayed on user device 112 and the transactions component 123 may automatically perform one or more operations, as described below.

Referring again to the examples illustrated by FIG. 1, as further depicted by the intervention 108 of user interface 102*b*, in some examples, the user may be presented an affordance 111 (e.g., "Show Me More Options" or the like) that allows the user select one or more options to satisfy the request for the amount of funds. In some examples, upon the user selecting the affordance 111 (e.g., "Show Me More Options") (at user interface sequence step 114), the payment service application executing on the user device 112 may transmit the selection to the user interface component 117. The user interface component 117 may request the artificial intelligence component 118, or another component, to generate options for the user to access funds. As described herein, the artificial intelligence component 118 may be trained or may use one or more machine-learning models trained to receive as input various signals associated with the user (e.g., demographic information, stated or inferred preferences), the user's accounts (e.g., number of accounts, status of each account, current balance, balance history, transaction history), and the like.

In some examples, the artificial intelligence component 118 may identify a set of one or more options 109 (at user interface sequence step 115) for the user to take to access requested funds, and the user interface component 117 may display the set of options 109 via a user interface 102*c* on the user device 112. In some examples, the artificial intelligence component 118 may further output a recommendation of a preferred option. The recommendation may be selected based on one or more goals set for the artificial intelligence component 118 by the user or by the payment service system 106. Such goals can include minimizing a number of transactions to be conducted by the user, minimizing penalties incurred by the user, minimizing an amount of debt taken on by the user, maximizing a tax refund, and the like. The artificial intelligence component 118 may provide the identified set of options 109 and, in some examples, a recommendation to the user interface component 117 responsible for generating and displaying the user interface 102*c*. It should be noted that in additional or alternative examples, a set of rules or other techniques can be used to identify one or more options to present to the user.

In some examples, as depicted by user interface 102*c*, at user interface sequence step 115 a list of funding options 109 (e.g., loan advance option 109*a*, a sale of other assets option 109*b*, such as a cryptocurrency asset, withdrawal from a pool of funds option 109*c*, or withdrawal of restricted funds option 109*d*, which may incur a penalty) may be displayed to the user.

For example, as will be discussed in greater detail below, a user selection of the loan advance option 109*a* (at user interface sequence step 115) may correspond to an advance offer generating component 120 surfacing an advance offer to advance an amount of funds corresponding to the user's initial request for an amount of funds and the artificial intelligence component 118 identifying a set of repayment terms for repaying the advanced amount of funds, so as to prompt or to recommend to the user to accept the loan advance option 109*a* in lieu of the withdrawal of restricted funds option 109*d*, for example. Upon user selection of the loan advance option 109*a*, the balance management component 119 may access the advanced amount of funds as owned by the payment service and the transactions component 123 may then transfer the advanced amount of funds to the unrestricted balance 134 of the user for use as unrestricted funds. In some examples, the user can repay the loan in monthly installments, as a lump sum at a later time, etc. In some examples, portions of one or more subsequent deposits (e.g., from direct deposits, tax refunds, peer-to-peer payments, etc.) can be withheld to repay the loan. In some examples, in lieu of a loan, the payment service system 106 can issue credit to the user, which can be repaid via the same or similar mechanisms described above.

In some examples, one or more operations can be performed that can enable the user to access the amount of funds requested without the user incurring a penalty or other consequence associated with a restricted account. For instance, a user may have assets in an unrestricted balance that can be access or sold to generate the amount of funds requested. In an example, a user selection of the sale of other assets option 109*b* (at user interface sequence step 115) may correspond to the user account selection component 121 selecting unrestricted balances 134, the balance management component 119 accessing funds of the unrestricted balances 134, and the transactions component 123 executing a sale of a cryptocurrency asset (e.g., BTC) to generate an unrestricted fiat currency amount corresponding to the user's initial request for an amount of funds and transferring the unrestricted fiat currency amount to the unrestricted balance 134 of the user for use as unrestricted funds. In some examples, the balance management component 119 can analyze transaction data and/or other data associated with the user to determine resulting penalties or consequences resulting from such operations (e.g., tax consequences or benefits, etc.).

In some examples, as described above, users can pool funds together and/or the payment service system 106 can own and/or manage assets that are allocated to individual users using a ledger system. In some examples, such funds and/or assets can be restricted. In at least one example, an option can correspond to a user contributing funds to pooled funds or accounts owned and/or managed by the payment service system 106. In this way, the user may be able to access an amount of the funds that are stored in the pooled account and/or account owned and/or managed by the payment service system 106 via an adjustment to one or more ledgers. In some examples, a user selection of the withdrawal from a pool of funds option 109*c* (at user interface sequence step 115) may correspond to the user account selection component 121 selecting restricted balances 132 and unrestricted balances 134 corresponding to a pooled account to which the user has contributed, the transactions component 123 reallocating a portion of the restricted balances 132 corresponding to the pooled account from being owned by the user (e.g., based on their contribution to the pooled account) to being owned by the payment service, the transactions component 123 reallocating a portion of the unrestricted balances 132 corresponding to the pooled account from being owned by payment service to being owned by the user, and the transactions component 123 transferring an amount of funds based on the user's initial request from the unrestricted balance 132 corresponding to the pooled account to the unrestricted balance 134 of the user for use as unrestricted funds. The reallocation and transfer of the balances corresponding to the pooled account can be performed, using the techniques described herein, without the involvement of external services or providers.

As described above, in some examples, the balance management component 119 can modify one or more ledgers to enable the user to access the funds in the unrestricted balance. In some examples, the user may have a period of time to replenish the funds before the funds are pulled from the restricted balance. That is, in some examples, the funds may be provided as an advance, such that the amount is transferred to the unrestricted balance 134 of the user for use as unrestricted funds. In some examples, such funds can originate from an account or pooling of funds managed and/or owned by the payment service system 106. In such examples, portions of one or more subsequent deposits (e.g., from direct deposits, tax refunds, peer-to-peer payments, etc.) can be withheld until the payment service system 106 is repaid. If the subsequent deposit(s) are insufficient to repay the payment service system 106 within a period of time, the payment service system 106 can access the amount of funds advanced from a restricted balance of the user.

In some examples, a selection of the withdrawal of restricted funds option 109*d* (at user interface sequence step 115) may correspond to the user account selection component 121 selecting restricted balances 132, the balance management component 119 accessing restricted funds of the restricted balances 132, and the transactions component 123 transferring the restricted funds from the restricted balances 132 to the unrestricted balance 134 of the user for use as unrestricted funds.

In some examples, as further illustrated by user interface 102*c*, along with presenting the list of funding options 109, information regarding the impact (e.g., consequence) of each option may be provided to the user. Said information can include a reminder of the penalties that may be incurred for accessing restricted funds or tax implications associated with sale of other assets. As illustrated, the user interface 102*c* further indicates that the loan advance option 109 is a recommended option, which may be determined by the artificial intelligence component 118 and/or another component based on a set of one or more rules, user preferences, optimization of a particular financial goal, or the like. Upon selection of one of the provided options 109, the payment service application may transmit the selection to the user interface component 117. The user interface component 117 then facilitates the performance of the selected option.

For example, based on the selection of the loan advance option 109 by the user, the advance may be transferred out of an unrestricted balance owned or otherwise associated with the payment service. In some examples, the advance may be transferred out of an unrestricted balance owned or otherwise associated with another user of the payment service (e.g., as a peer-to-peer advance). In some examples, the amount of funds that may be automatically transferred may be less than or equal to the amount of funds available in the restricted balance 132 of the user. In some examples, as will be further appreciated below with respect to FIGS. 2A, 2B, 3A-3D, the payment service system 106 may utilize the advance offer generating component 120 and the artificial intelligence (AI) component 118 to generate a user-customized set of loan repayment terms for repaying the advanced amount of funds.

In some examples, the advance offer generating component 120 may, in conjunction with the artificial intelligence component 118 (which may include a combination of hardware and software artificial intelligence accelerators for executing one or more machine-learning models or other predictive models) that may be suitable for use to generate a user-customized set of loan repayment terms for repaying the advanced amount of funds. In some examples, the artificial intelligence component 118 may include, for example, one or more of a univariate logistic regression model, a multivariate logistic regression model, a random forest model, a Naïve Bayes model, a gradient boosting model, or a neural network that may be trained to generate a recommendation of repayment terms based on a data set of user transaction history and financial data as inputs and as accessible from the one or more data stores 128.

For example, the data set of user transaction history and financial data may include one or more of expected income (e.g., deposits, direct deposits) of the user, total value of assets (e.g., fiat currency, cryptocurrency, stocks, bonds, exchange-traded funds (ETFs), and so forth) owned by the user, employment status of the user, expected payments received by the user via the payment service application, monthly utility payments paid by the user via the payment service application, repayment plan history of the user, and so forth. In some examples, the artificial intelligence component 118 may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a tensor processing unit (TPU), a neuromorphic processing unit (NPU), a deep-learning processor (DLP), and/or other AI accelerator that may be suitable for processing various transaction data and financial data and making one or more predictions based thereon), software (e.g., instructions running/executing on one or more processing devices), firmware (e.g., microcode), or some combination thereof.

In some examples, the artificial intelligence component 118 may be trained to generate a recommendation of repayment terms by accessing the data set of user transaction history and financial data associated with the user and/or one or more other users of the payment service system 106, inputting the data set of user transaction history and financial data into the artificial intelligence component 118 to generate a number of recommendations of amounts of funds to be transferred to unrestricted balances 134 and a number of respective conditions associated with the transfers, and outputting, by the artificial intelligence component 118, the recommendations for acceptance or rejection. In some examples, the artificial intelligence component 118 may be further trained by iteratively inputting the acceptance or rejection of each of the recommendations into the artificial intelligence component 118, and, further, iteratively updating the artificial intelligence component 118 based on the acceptance or rejection of each of the recommendations.

In some examples, the transactions component 123 may be utilized to execute user requests, payments, transfers, or other transactions for example, between the user account balances including restricted balances 132 and unrestricted balances 134, between one or more of the user account balances including restricted balances 132 and unrestricted balances 134 and balances of one or more other users, and/or between the user account balances including restricted balances 132 and unrestricted balances 134 and one or more of the third-party platforms 130 (e.g., third-party financial institution). In some examples, the transactions component 123, in conjunction with the advance offer generating component 120, may automatically accept the user-customized set of loan repayment terms for repaying the advanced amount of funds as generated by the advance offer generating component 120 and render the advanced amount of funds for immediate use in the unrestricted balance 134 of the user in accordance with one or more sets of terms and agreements pre-approved by the user.

In some examples, the advance offer generating component 120 may include any component suitable for surfacing an advance offer to advance an amount of funds in response to a user selection 103 of an affordance 107 corresponding to a restricted user account or otherwise a request for an amount of funds corresponding to restricted balances 132. For example, the advance offer generating component 120 may identify and offer one of a number of financial products or financial instruments (e.g., a secured loan offer, an unsecured loan offer, a tax credit offer, a promissory note, a contract, or other similar financial product or financial instrument) serving as the basis for the advance of amount of funds to be advanced to the user. In some examples, the advance offer generating component 120 may operate in conjunction with the artificial intelligence component 118. For example, the advance offer generating component 120 may generate an advance offer to advance an amount of funds and the artificial intelligence component 118 may then identify a set of repayment terms for repaying the advance an amount of funds based on the user transaction data and financial data and/or the type of financial product or financial instrument serving as the basis for the advance of amount of funds to be advanced to the user.

In some examples, based on the selection of an option from the set of options 109 to sell other assets (e.g., a cryptocurrency asset), as illustrated in FIG. 1, the transactions component 123 may cause the transfer of the other asset from the user account of the user to a corresponding account of the payment service or another user. The other assets may include, by way of example and not limitation, cryptocurrency, securities, stocks, options, bonds, futures, and the like. In return, the transactions component 123 may cause the transfer of a corresponding amount of traditional currency into a corresponding unrestricted balance 132 of the user. As described herein, this transfer may be performed internally to the payment service system 106 (e.g., without sending a request or confirmation to an external service provider) and may be performed in real-time or near real-time, so that the transferred traditional currency may be available to the user immediately.

While four options are illustrated in FIG. 1, any number of options can be available and/or presented to the user via the user interface described. In some examples, as described above, the artificial intelligence component 118 can recommend an option that is optimal for a user. In such examples, artificial intelligence and/or machine-learning can be used to make such a recommendation. For example, the artificial intelligence component 118 may be trained to generate such optimal recommendations based on or associated with characteristics of a user (e.g., user risk tolerance, user spending habits, and so forth), the status of the user's restricted and unrestricted accounts, transactional history information of and with the user, the user's overall financial health, and related data. In some examples, training data used to train such models may include data associated with a number of different users of the payment service system, a subset of different users, or individual users. This can enable differentiated levels of personalization and/or customization for actionable recommendations output by the models. In some examples, recommendations can be denoted by a particular user interface element, animation, or the like as illustrated by the star-icon included in loan advance option 109*a*, for example.

Further, while techniques described in FIG. 1 are described with reference to user selection of various options, in some techniques, the artificial intelligence component 118, the balance management component 119, the advance offer generating component 120, the user account selection component 121, and the transaction component 123 may operate in conjunction to perform operations automatically without input from the user. Specifically, while the present examples illustrate a process in which the user interface 102*b* may display the user intervention 108 in response to a user selection 103 of the affordance 107 corresponding to a restricted user account, in other examples, in response to a user selection 103 of the affordance 107 corresponding to a restricted user account, the user interface component 117 may forgo causing the user intervention 108 and the set of options 109 to be displayed on user device 112. The artificial intelligence component 118 and the advance offer generating component 120 may then identify (in the background) an optimal advance of funds and repayment terms, and then the balance management component 119 may access unrestricted balances 134 and the transactions component 123 may automatically update the restricted balances 132 based on optimal advance of funds.

For example, a portion of the restricted balances 132 corresponding to the user's restricted account, may be set aside as owned or owed to the payment service while a portion of the unrestricted balances 134 may be transferred to the user's unrestricted balance 134. The user may be notified of the repayment terms (e.g., a date by which an indicated amount must be repaid or else the set aside portion of the restricted balances 132 will be withdrawn to repay the payment service and the corresponding penalties assessed to the user. As another example, in response to user selection 103 of the affordance 107 corresponding to a restricted user account, the artificial intelligence component 118 may identify an amount of another asset (e.g., cryptocurrency assets, securities asset) owned by the user to sell on behalf of the user so that the user can access a requested amount of funds. The balance management component 119 and transactions component 123 may coordinate to transfer the identified amount of the other asset to the payment service and in return may transfer the requested amount of funds to the user. In some examples, as described herein, these transfers may be conducted by adjusting internal balances maintained by the payment service and without the involvement of external systems. The examples given herein are not limiting, and other automated transactions may be conducted in lieu of display of the user intervention 108. The automated transactions may be approved or authorized by the user in advance, for example, the user may have preapproved automatic sales of selected cryptocurrency up to a specified amount or automated acceptance of loans up to a specified amount.

Figure 2B:
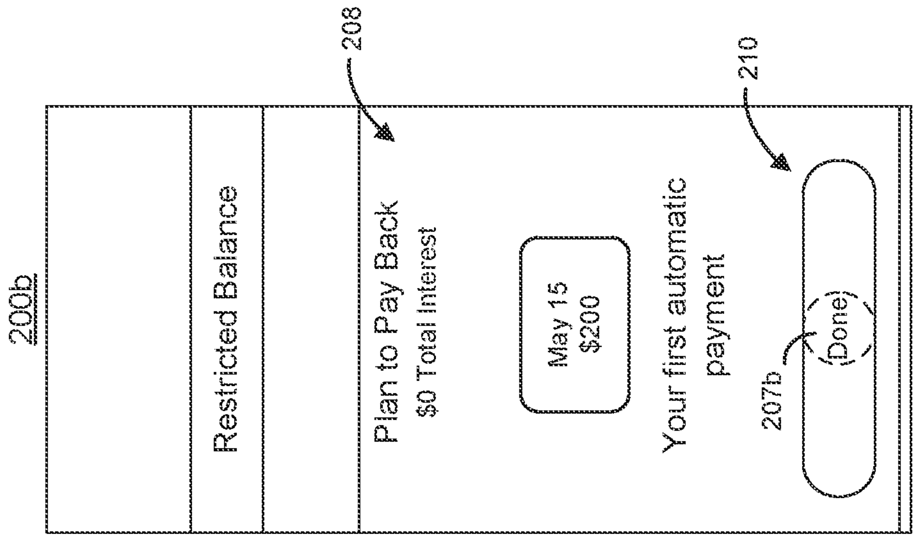
FIGS. 2A and 2B illustrate examples of facilitating user access to restricted assets through user-selected repayment terms according to embodiments disclosed herein.
Figure 2A:
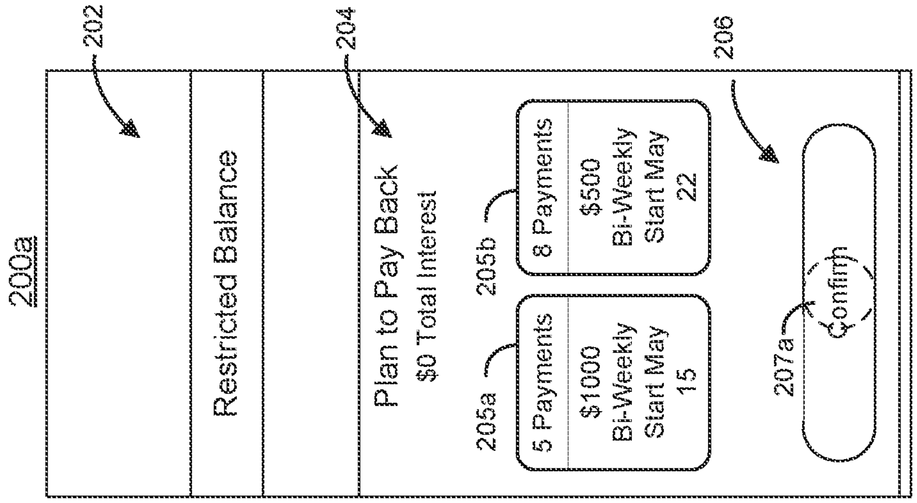

FIGS. 2A and 2B illustrate one or more examples of techniques for facilitating user access to restricted funds in restricted balances associated with restricted accounts by advancing an advance amount based on repayment terms accepted by a user, in accordance with presently disclosed embodiments. In some examples, FIGS. 2A and 2B may illustrate user interfaces 200*a* and 200*b* corresponding to offers to advance funds and repayment plans that may be generated and displayed in response to a user requesting or attempting to transfer an amount of funds from restricted balance associated with a restricted account maintained by the payment service system 106 on behalf of a user. FIGS. 2A and 2B may be display, for example, as an alternative to selection of affordance 206 when the advance offer generating component 120 has not been authorized by the user to accept the offer on behalf of the user or when the offer exceeds a threshold amount after which user authorization is required. For example, interface 200*a* includes a first user element indicating that the user is requesting or attempting to transfer an amount of funds (e.g., $5000) from a restricted balance 202. As described herein, the advance offer generating component 120 has generated sets of repayment terms 205A and 205B (using, for example, the intelligence or models supported by the artificial intelligence component 118) for consideration by the user which are displayed in an updated intervention 204 to encourage the user to accept the funds advance in lieu of accepting the penalty associated with the restricted account.

In some examples, the advance offer generating component 120 in conjunction with the artificial intelligence component 118 (e.g., one or more of a univariate logistic regression model, a multivariate logistic regression model, a random forest model, a Naïve Bayes model, a gradient boosting model, a neural network, or other suitable machine-learning model) that may be trained to generate a recommendation of repayment terms for repaying advance amounts to generate the set of repayment terms 205A and 205B for repaying an advance of funds corresponding to the amount of funds requested to be transferred from the restricted account 202. Specifically, as displayed by the user interface 200*a* of FIG. 2A, the advance offer generating component 120 may provide information to the user interface component 117 to automatically update the notification or intervention displayed by the payment service application.

The present embodiments can be updated in real-time or near real-time (e.g., as the user interacts with the payment service application and without substantial delay) to include an offer for the advance of funds corresponding to the amount of funds (e.g., $5000) requested to be transferred from the restricted account 202 along with the generated set of repayment terms 205A and 205B. In some examples, the user may then select one of the sets of repayment terms 205A and 205B and confirm the selection by way of affordance 206 (e.g., "Confirm"). The transactions component 123 can cause the agreed-upon amount to be credited to the unrestricted balance 134 associated with the unrestricted balance of the user. In some examples, the transactions component and balance management component 119 can coordinate to instantiate a new unrestricted account for the user associated with a new unrestricted balance for the user with the agreed upon amount of the advance. As depicted by the user interface 200*b* of FIG. 2B, the payment service application may then display a notification 208 indicating the first payment in accordance with the selected repayment terms to be confirmed by the user by way of affordance 210 (e.g., "Done").

FIGS. 3A-3E illustrate one or more examples of user interfaces 300*a*, 300*b*, 300*c*, 300*d*, and 300*e* for facilitating user access to restricted funds in restricted balances associated with restricted accounts by providing an advance amount and surfacing advance repayment terms utilizing an example payment service application 302 associated with a payment service system 106, the payment service application 302 executing on a user device (e.g., user device 112). The payment service application 302 may provide functionalities for a user to access and manage repayments of advance amounts of funds advanced in lieu of using funds in one or more restricted accounts 132 on the payment service system 106.

Figures 3A, 3B, 3C:
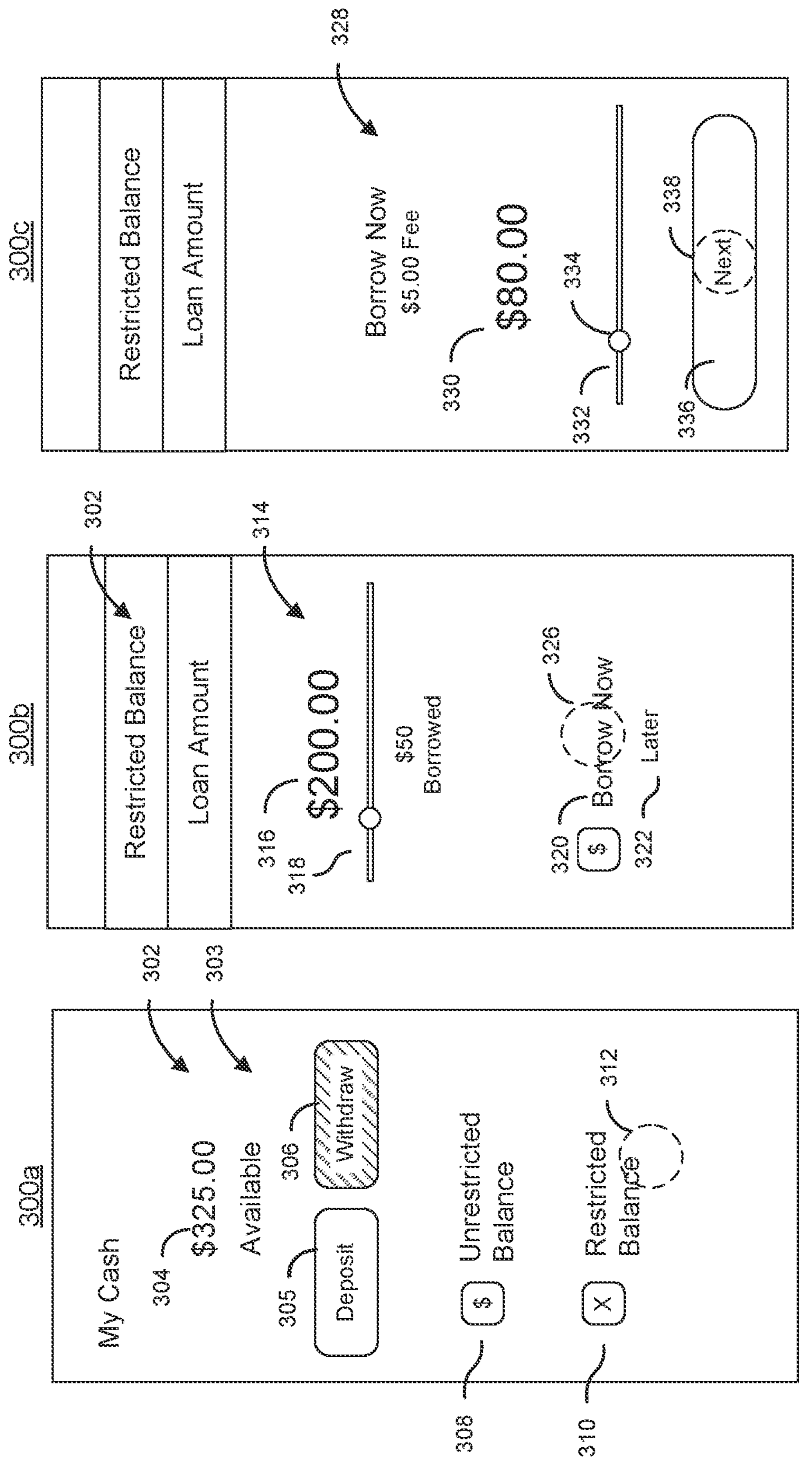
FIGS. 3A-3E illustrate examples of facilitating user access to restricted assets through user-selected repayment terms according to embodiments disclosed herein.

As illustrated by FIG. 3A, such functionalities may be provided in the user interface 303. The user interface 303 may include a restricted balance 304 (e.g., $325) associated with the user account displaying the amount of funds currently available, a "Deposit" affordance 305 directing the user to an interface for adding additional funds to the restricted balance 304, and a "Withdraw" affordance 306 directing the user to an interface for withdrawing funds from the restricted balance 304. The user interface 303 may include an "Unrestricted Balance" affordance 308 directing the user to an interface for managing one or more unrestricted balances associated with one or more unrestricted accounts owned by the user and a "Restricted Balance" affordance 310 directing the user to an interface displayed in response to the user selecting the "Withdraw" affordance 306 or otherwise requesting to withdraw funds from the restricted balance 304. As shown in FIG. 3A, the user may select the "Withdraw" affordance 306 and indicate the source of the withdrawal as their restricted balance by way of a user input 312.

The user interface 314 shown in FIG. 3B illustrates the result of the user selecting the "Withdraw" affordance 306. After the user selects the "Withdraw" affordance 306, the balance management component 119 interprets the request as a request to withdraw funds from the restricted account associated with the user. The balance management component 119 may request the user interface component 117 to display a user intervention to prevent the withdrawal and may also request the advance offer generating component 120 to generate an advance offer for the requested amount of funds and corresponding repayment terms. As illustrated in FIG. 1 the user intervention may result in the user selecting from multiple options for accessing requested funds. In some examples, the user may select to receive an advance amount of funds in lieu of incurring a penalty by accessing a requested balance. In some examples, the user may be directly presented with a user interface 314 to select an amount to receive as an advance amount. The user interface 314 may include the available advance amount 316 determined by the advance offer generating component 120, an indication 318 of how much may be borrowed against the restricted balance 304, a "Borrow Now" affordance 320 directing the user to an interface for selecting a portion of the advance amount 316 to access now, and a "Later" affordance 322 directing the user to an interface for selecting a portion of the advance amount 316 to access at a later date. As shown in FIG. 3B, the user may select the "Borrow Now" affordance 320 by way of a user input 326.

The user interface 328 shown in FIG. 3C illustrates the result of the user selecting the "Borrow Now" affordance 320 through the user input 326. The user interface 328 may be presented as an overlay of the user interface 314 or as a continuation of user interface 314. The user interface 328 may include an amount 330 indicative of portion of the advance amount 316 the user wishes to borrow, a slider element 332 with an affordance 334 to indicate what portion of the advance amount 316 the user wishes to borrow, and a "Next" affordance 336 directing the user to an interface for determining a set of repayment terms for repaying the advance amount 316 and/or portion of the advance amount 316. In some examples, the advance offer generating component 120 of the payment service system 106 may receive an indication of an attempted transfer from the restricted balance 304 and then automatically determine an amount 330 the user may wish to borrow in conjunction with the artificial intelligence component 118.

Figure 3E:
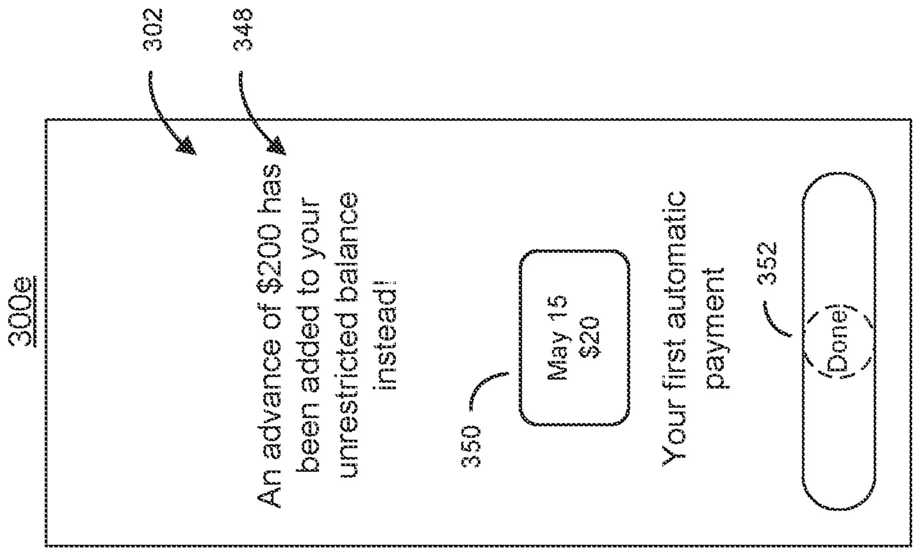
Figure 3D:
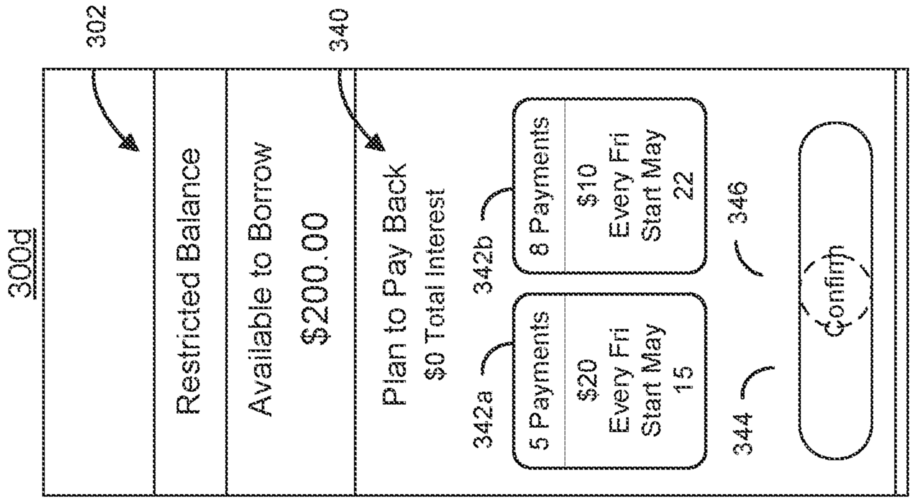

The user interface 340 shown in FIG. 3D illustrates the result of the user selecting the "Next" affordance 336 through the user input 338. The user interface 340 may be an intervention overlaying the user interface 314. As described herein, the advance offer generating component 120 of the payment service system 106 may determine an amount of funds to advance and the artificial intelligence component 118 may identify repayment terms customized for the needs of the user. In the illustrated example, the artificial intelligence component 118 has identified a set of repayment terms that charge a fixed payment schedule instead of an interest rate for the advance amount generated by the advance offer generating component 120. Additionally, the advance offer will prevent the user from incurring penalties associated with withdrawing funds from the restricted account. In some examples, the artificial intelligence component 118 may identify multiple repayment schedules that may work best for the user based on the transaction history, income, and cash flow of the user. The user interface 340 may include suggested repayment terms 342*a* among other repayment terms, such as repayment terms 342*b*, and a "Confirm" affordance 344 directing the user to an interface confirming a request to transfer funds from corresponding to the advance amount 316 to the user's unrestricted balance.

As shown in FIG. 3D, the user may select the "Confirm" affordance 344 by way of a user input 346. In some examples, a first set of repayment terms 342*a* may be selected and may be differentiated from other repayment terms 342. As an example, and not by way of limitation, the first set of repayment terms 342*a* may be highlighted indicating the currently selected set of repayment terms 342*a*. In some examples, there may be any number of sets of repayment terms 342 that the user may be surfaced by the payment service system 102 based on user transaction and financial data. The user interface 348 shown in FIG. 3E illustrates the result of the user selecting the "Confirm" affordance 344 by way of a user input 346. The user interface 348 may include a confirmation date of the first payment 350 and a "Done" affordance 352 directing the user back to user interface 303, which would show the updated unrestricted balance.

FIGS. 4A-4D illustrate one or more examples of techniques for facilitating user access to restricted funds in restricted balances associated with restricted accounts by advancing an advance amount from a pooled amount of funds into which the user has invested, in accordance with presently disclosed embodiments. For example, and as described herein, the payment service system 106 may utilize a ledger system to pool funds deposited by multiple users in respective restricted accounts utilizing the user interface of the payment service application. In some examples, when a user requests to access funds in the restricted account, the payment service system 106 may use the ledger system to make an equivalent amount of funds available to the user (e.g., crediting an unrestricted balance associated with the user in the ledger) without incurring the penalties ordinarily associated with the restricted account (e.g., by internally debiting the restricted account, without causing that transaction to be executed by an external service provider).

In some examples, when a user deposits or transfers funds into their restricted account, the payment service system 106 may record this deposit as the user buying a stake in the pooled fund. In some examples, the payment service system 106 may maintain multiple distinct pooled funds into which a user can selectively deposit the funds of their restricted account. As described herein, the allocation to a specific pooled fund can be done at the request of the user, based on recommendations provided by the payment service system 106, or automatically based on prior user authorization. For example, the payment service system 106 may attempt to identify users similar to the user that have already used the pooled fund and recommend the user utilize the same specific pooled fund.

In some examples, the artificial intelligence component 118 (or a trained machine-learning model used by the artificial intelligence component 118) may identify a cluster of users that may be displayed to the user based on, for example, user transaction history data, user purchase history data, user attribute data, user credit history data, user investment profile data, user contextual data, user interaction data, user preference data, or other data privately stored on the payment service system 106 that associates the user to the machine-learning model identified cluster of users. The user may then select to pool their funds with the machine-learning model identified cluster of users identified as being associated to the user.

In some examples, as depicted by user interface 400*a*, the user device 112 may display a notification 402, which may prompt the user to transfer an amount of a funds into a restricted account associated with a pool of funds of a cluster of users. The pooled fund may include a large source of funding for saving or investing. In some examples, assets (e.g., investments) acquired using the pooled fund, or benefits of those assets, can be allocated to the user, and to other users who have placed funds into the same type of restricted account (e.g., on a pro-rated basis). The displayed notification 402 may further include a suggested amount of funds 404 (e.g., "$1000") to be pooled. In response to the user selecting an amount of funds (e.g., "$200") to be pooled and confirming the selection by way of an affordance 406, a user interface 400*b* may then be displayed on the user device 112. In some examples, as depicted by user interface 4004, the user device 112 may display a listing of pooled investments 408 that the user may select to participate in.

In some examples, the user may select an option "Help Me Decide." In response to the user selecting the option "Help Me Decide" and confirming the selection by way of an affordance 410, a user interface 400*c* may then be displayed on the user device 112. User interface 400*c* may be used to collect stated preferences from the user to facilitate the application of the artificial intelligence component 118 towards the task of recommending a particular pooled fund to the user. In some examples, as depicted by user interface 400*c*, the user device 112 may display a listing of options 412 for the user to select their short-term or long-term investment goals. In some examples, based on the selection of the user, and, for example, user transaction history data, user purchase history data, user attribute data, user credit history data, user investment profile data, user contextual data, user interaction data, user preference data, or other data privately stored on the payment service system 106, the artificial intelligence component 118 may make a recommendation for the user. User interface 400*d* may be displayed on the user device 112 with the recommendation. Specifically, in response to the user selecting one of the displayed listing of options 412 and confirming the selection by way of an affordance 406, the user interface 400*d* may then be displayed on the user device 112.

Figure 4A:
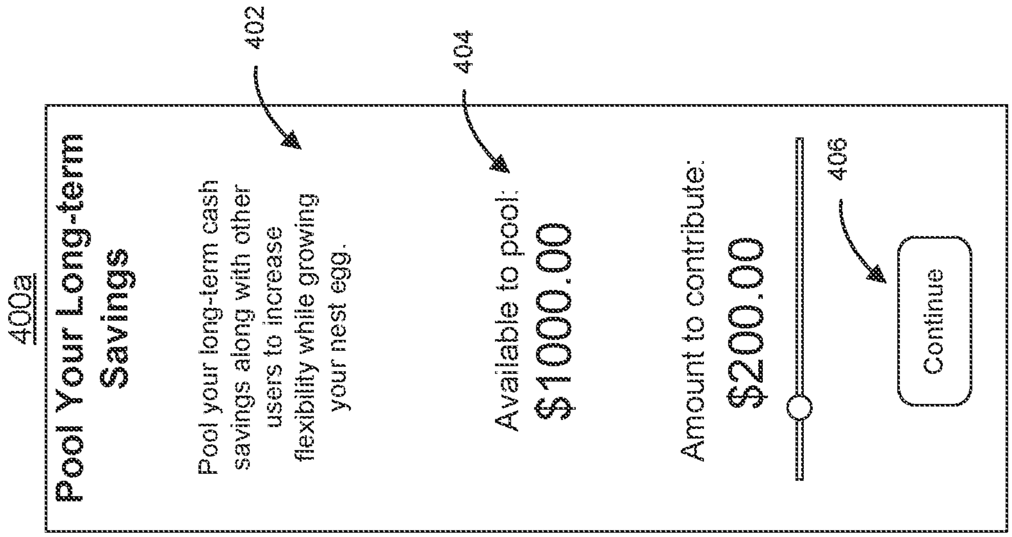
FIGS. 4A-4D illustrate one or more examples of techniques for facilitating user access to restricted funds in restricted balances associated with restricted accounts by advancing an advance amount from a pooled amount of funds into which the user has invested according to embodiments disclosed herein.
Figure 4B:
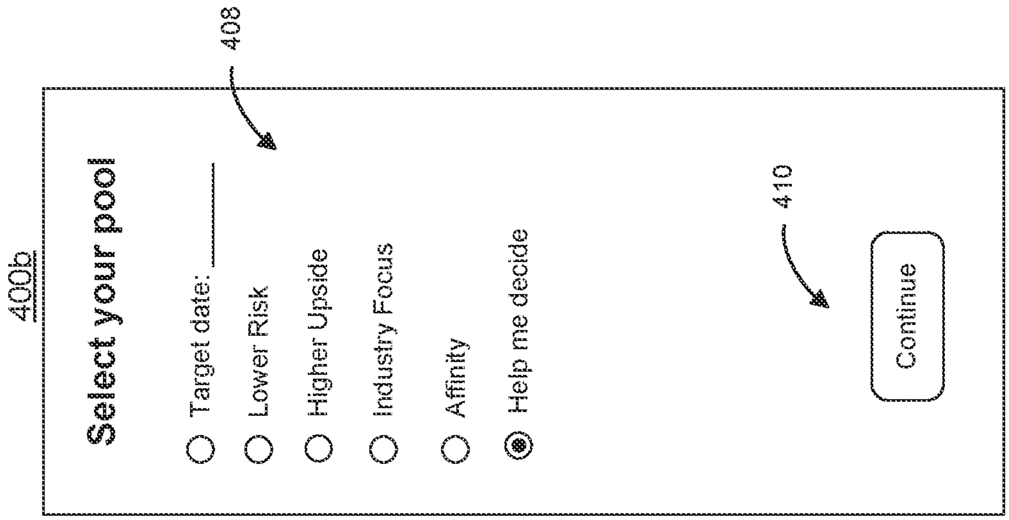
Figure 4C:
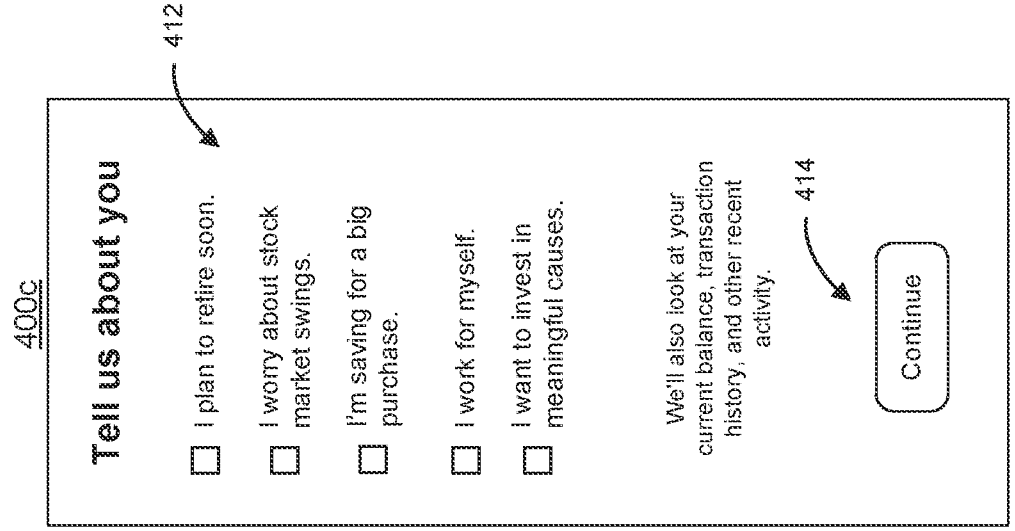
Figure 4D:
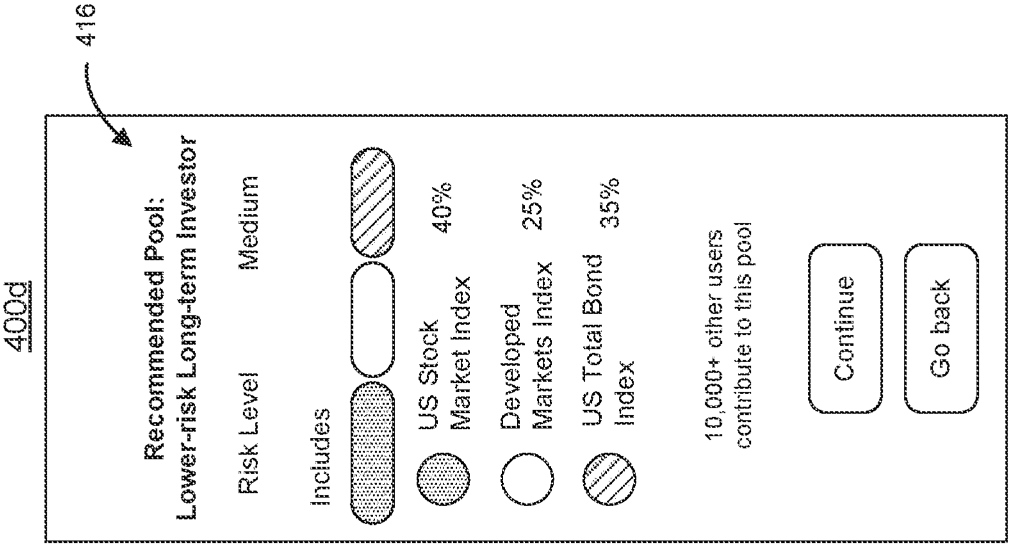

In some examples, as depicted by user interface 400*c*, the user device 112 may display a listing of pooled investments 408 that the user may select to participate in. As depicted by user interface 400*d*, in some examples, based on the selection of the user indicating investment goals, and, for example, user transaction history data, user purchase history data, user attribute data, user credit history data, user investment profile data, user contextual data, user interaction data, user preference data, or other data privately stored on the payment service system 106, the artificial intelligence component 118 may be utilized to infer interests of the user and recommend or surface pooled investments 414 to which the user should place their amount of funds to be pooled. In some examples, as illustrated in FIG. 4D, the composition of an individual user's investment or investment profile can be represented by a user interface 400*d* that presents information in a way that is easier for users to consume, especially on small form factors, such as mobile devices. For instance, the user interface 400*d* includes a user interface element representative of a broken line where each of the "pieces" of the line or linear bar represent a portion of the profile. For example, as will be further appreciated with respect to FIG. 5C below, the line or linear bar may be visually represented as linear bars of one or more colors, attributes, features, shading, etc., in which the respective lengths of the linear bars may correspond to an amount of the stock assets owned by the user and as allocated to, for example, stock markets, emerging markets, developed markets index funds, and total bond markets index funds, and so forth.

Figure 5A:
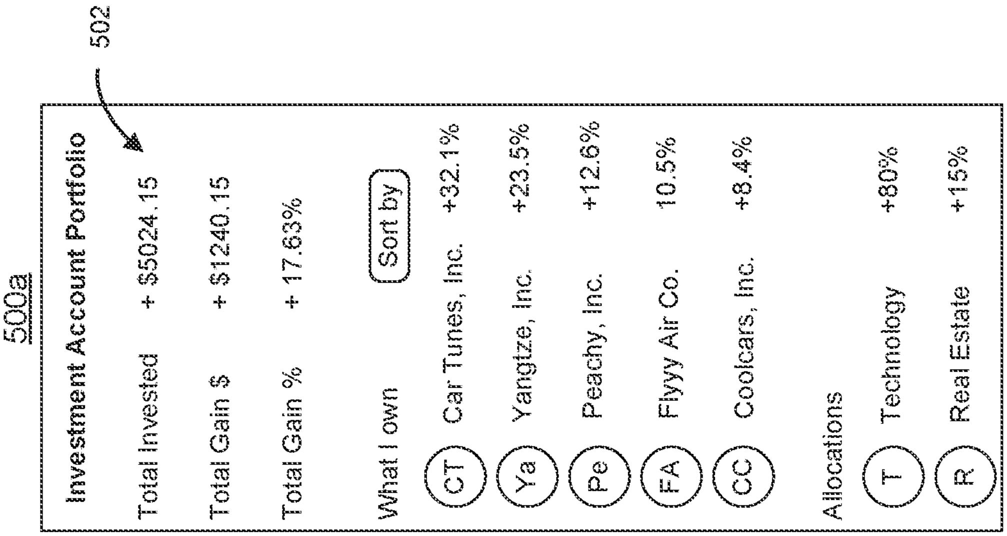
FIGS. 5A-5C illustrate examples for facilitating user access to restricted assets and interfaces for reviewing restrict account portfolios according to embodiments disclosed herein.
Figure 5B:
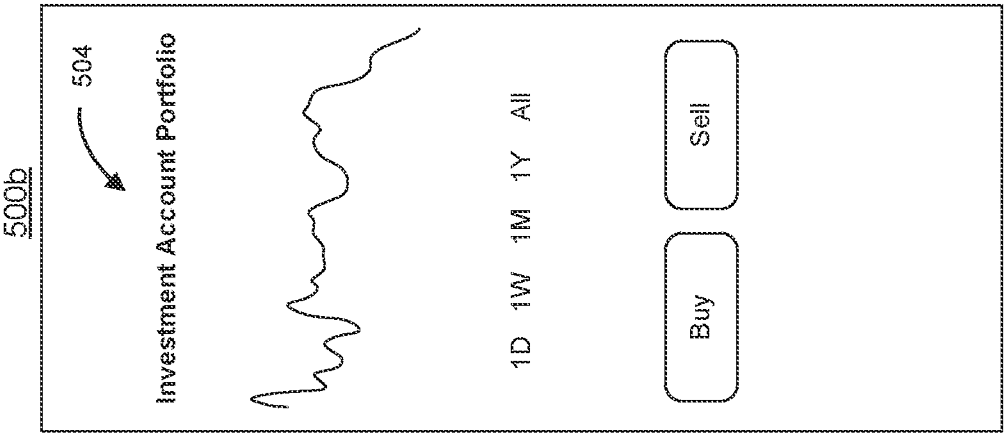
Figure 5C:
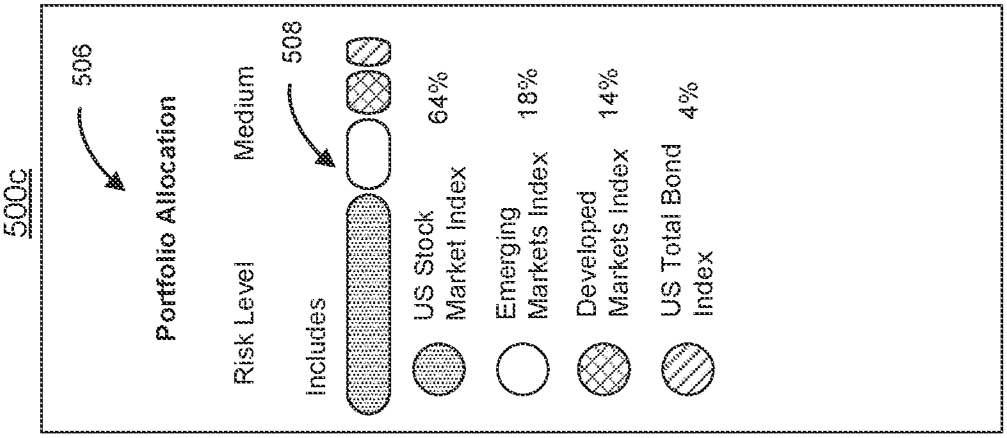

FIGS. 5A-5C illustrate one or more examples of the present techniques for facilitating user access to restricted assets, illustrating a restricted investment account of a user, in accordance with presently disclosed embodiments. In some examples, the user interfaces 500*a*, 500*b*, and 500*c* may illustrate examples of a restricted account investment profile of the user as may be displayed, for example, to another user or the user herself viewing the restricted account investment profile of the user. The user interface 500*a* of FIG. 5A illustrates the portfolio breakdown 502 of the stock assets (e.g., "Car Tunes, Inc.", "Yangtze, Inc.", "Peachy, Inc.", "Flyyy Airlines", and "CoolCars, Inc.") owned by the user.

As illustrated, the portfolio breakdown 502 may also include the stock symbols of the companies displayed together with the identity of the companies and the real-time or near real-time market performance (e.g., gains, losses, investment totals, and so forth) of the individual stocks owned by the user. As illustrated, the user interface 500*a* of FIG. 5A may illustrate a textual representation of the portfolio breakdown 502 of the user, for example. In some examples, the user may select one or more displayed affordances of the user interface 500*a* to display a view a visual representation of the portfolio breakdown 502. For example, as further depicted, the user interface 500*b* of FIG. 5B illustrates a visual representation of the performance 504 of the asset portfolio of the user over time (e.g., daily, monthly, quarterly, or annually).

In other examples, as depicted by the user interface 500*c* of FIG. 5C, the user may select one or more displayed affordances of the user interface 500*b* to display and view the portfolio allocation 506 of the restricted investment account of the user. For example, the user interface 500*c* of FIG. 5C illustrates the portfolio asset allocations 508 as percentages of total assets in various types of funds including US domestic markets (e.g., "US Stock Market Index 64%"), emerging markets (e.g., "Emerging Markets Index 18%), developed markets (e.g., "Developed Markets Index 14%), and bond markets (e.g., "US Total Bond Index 4%).

As further illustrated, in some examples, the portfolio asset allocations 508 may be further visually represented as linear bars of one or more colors, attributes, features, shading, etc., in which the respective lengths of the linear bars may correspond to an amount of the stock assets owned by the user and as allocated to, for example, stock markets, emerging markets, developed markets index funds, and total bond markets index funds. For example, as the user has 64% of their stock assets allocated to stock markets, the linear bar portion corresponding to the stock assets allocated to stock markets may include a longer length and/or differing color as compared to, for example, the linear bar portion corresponding to the stock assets allocated to bond markets index funds representing only 4% of the assets allocation of the user. In further examples, the total length of the line may correspond to a particular value of the asset, instead of 100% of the user's assets. That is, in some examples, the total length of the line can represent a portion of assets, a value, or the like.

For example, the user may have set a goal that is represented by a linear bar running the width of the user interface. The current amount owned by the user may be represented with a linear bar graphic as illustrated in user interface 500*c*, with the balance left blank, shown in a faded or transparent fashion, or shown in another color. In some examples, the length of the linear bar, portions of the linear bar, colors or other attributes can be updated dynamically, for example in real-time or near-real-time, based at least in part on changes to a user's portfolio. The linear bar interface for displaying the relative proportions of ownership of assets (in this example security assets, but all types of assets generally) enables a user to understand, at a glance, the relative positions and values of the assets. Particularly on user devices with relatively small form factors, it is imperative that information is conveyed to a user in concise and unambiguous manner. The linear bar interface is an example of an improved user interface for conveying this type of information to a user.

Particular embodiments may repeat one or more steps of the process of any of FIGS. 6A-6F, where appropriate. Although this disclosure describes and illustrates particular steps of the process of any of FIGS. 6A-6F as occurring in a particular order, this disclosure contemplates any suitable steps of the process of any of 6A-6F occurring in any suitable order. Moreover, although this disclosure describes and illustrates an example method as described above, including the particular steps of the process of any of FIGS. 6A-6F, this disclosure contemplates any suitable method for performing the respective process, including any suitable steps, which may include all, some, or none of the steps of the process of any of FIGS. 6A-6F, where appropriate. Furthermore, although this disclosure describes and illustrates particular components, devices, or systems carrying out particular steps of the process of any of FIGS. 6A-6F, this disclosure contemplates any suitable combination of any suitable components, devices, or systems carrying out any suitable steps of the process of any of FIGS. 6A-6F.

The methods of any of FIGS. 6A-6F may be performed utilizing one or more processing devices (e.g., processing devices or servers) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

Figure 6A:
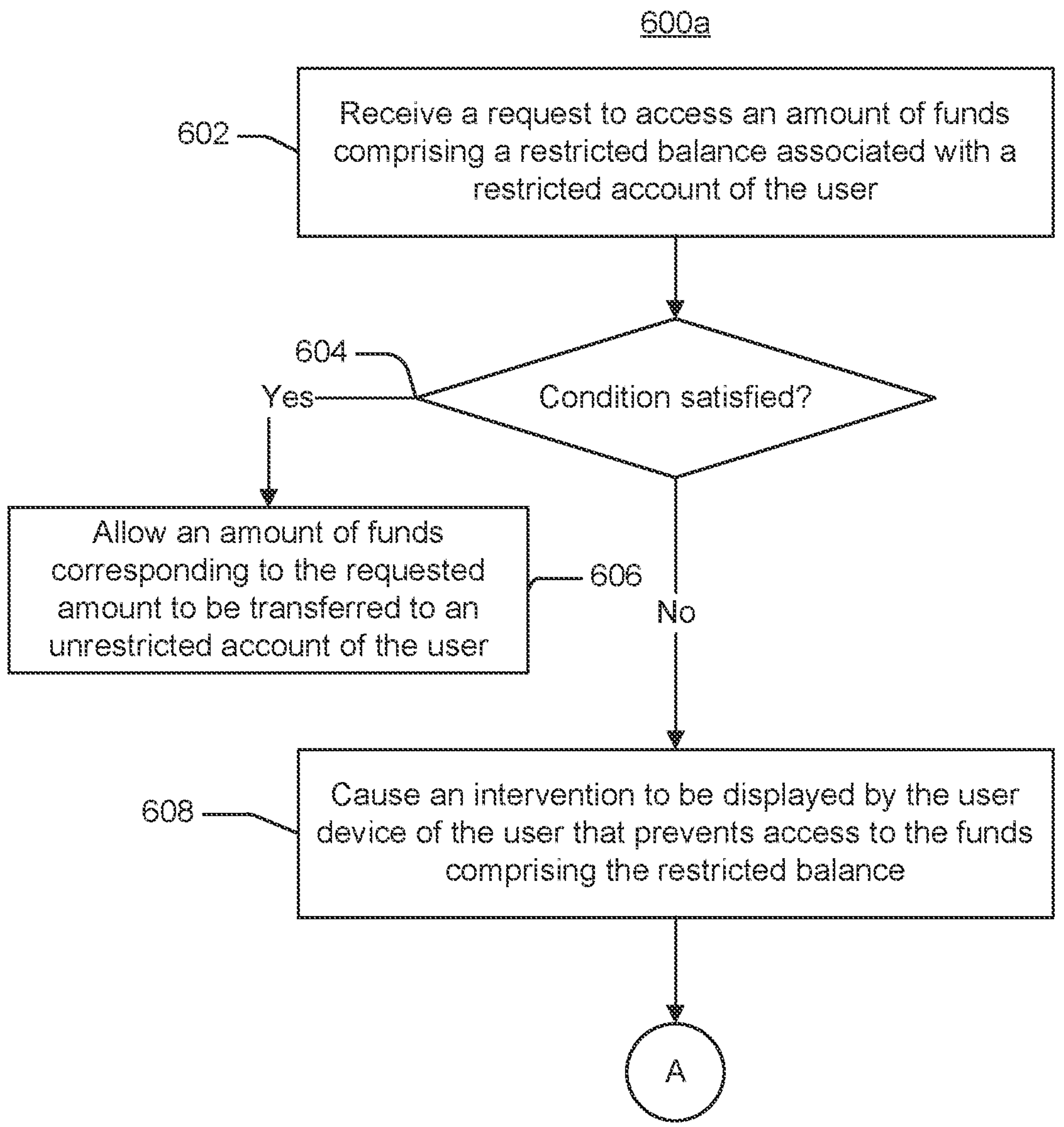
FIG. 6A illustrates an example method for facilitating user access to restricted assets according to embodiments disclosed herein.

FIG. 6A illustrates a flow diagram of a method 600*a* for facilitating user access to restricted assets, in accordance with presently disclosed embodiments.

The method 600*a* may begin at block 602 with the user interface component 117 receiving, from a user device 112 associated with a user of the payment service, a request to access an amount of the funds including a restricted balance associated with a restricted account of the user prior to satisfaction of the condition associated with the restricted account. In some examples, the conditions associated with restricted account may include that the user has held the restricted balance for a specified period of time, the age of the restricted account associated with the restricted balance, that the user is of a certain age or satisfies other criteria, or that the use of the restricted balance satisfies specified criteria (e.g., the recipient of a payment from the restricted balance is an educational institution).

The method 600*a* may continue at decision 604 with the balance management component 119 determining whether the condition associated with the restricted account has been satisfied. In some examples, the balance management component 119 may retrieve information associated with the restricted user account, including any applicable conditions and then evaluate whether the conditions associated with the restricted balance are satisfied, and, if not, may determine any applicable penalties that may be assessed against the user. In response to determining that the condition has been satisfied, the method 600*a* may continue at block 606 with the user account selection component 121 and balance management component 119 allowing an amount of funds corresponding to the requested amount to be transferred to an unrestricted account of the user by the transactions component 123.

In response to determining that the condition has not been satisfied, the method 600*a* may continue at block 608 with the user interface component 117 causing, in real-time or near real-time, an intervention to be displayed by the user device 112 that prevents access to the funds including the restricted balance. For example, the balance management component 119 may inform the user interface component 117 of the unsatisfied conditions and potential penalties. Because accessing the restricted balance associated with the restricted user account may incur penalties, the user interface component 117 of the payment service system 106 may cause to be displayed a user intervention 108, which may include a notification or similar intervention that prevents access to the funds corresponding to a restricted balances 132 for example. In some examples, the user intervention 108 may include a statement of the penalties that would be imposed by the transaction. In other examples, the user intervention 108 may include a notification widget, which may include a message reminding the user of their previously indicated short-term or long-term savings goals.

Figure 6B:
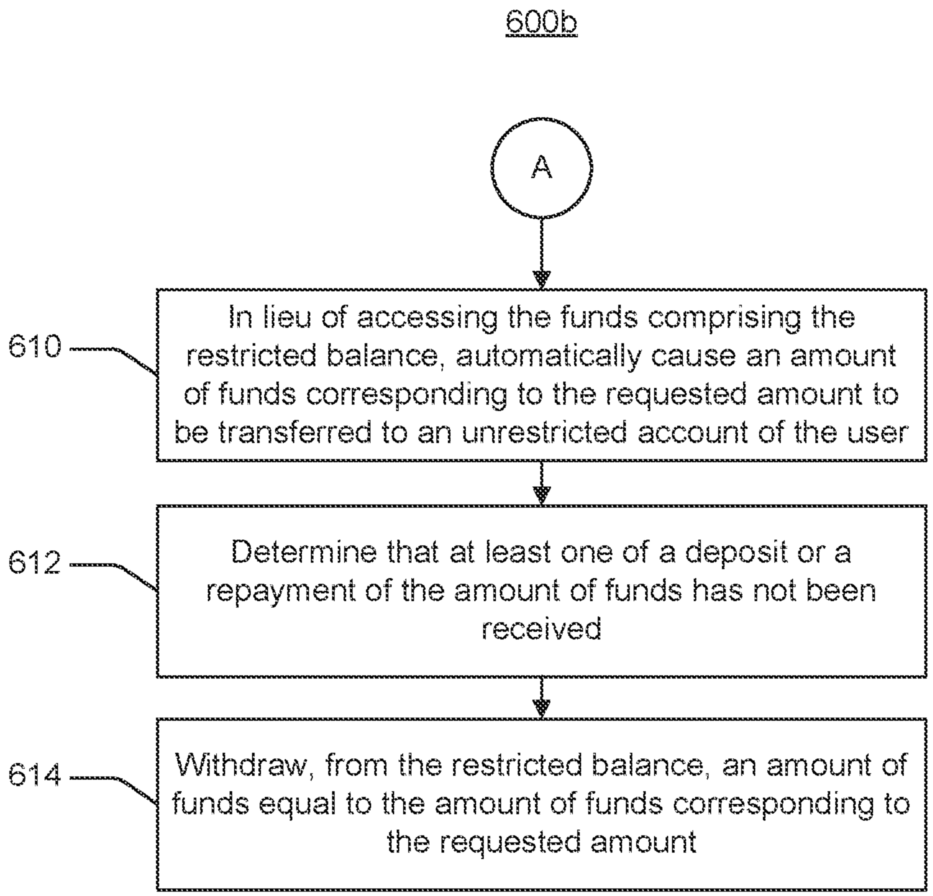
FIG. 6B illustrates an example method for facilitating user access to restricted assets by advancing a loan amount according to embodiments disclosed herein.

FIG. 6B illustrates a flow diagram of a method 600*b* continuing from placeholder "A" as illustrated by method 600*a* of FIG. 6A, in accordance with presently disclosed embodiments. For example, continuing from placeholder "A" as illustrated by method 600*a* of FIG. 6A, the method 600*b* may continue at block 610 with the balance management component 119 and transactions component 123 automatically causing an amount of funds corresponding to the requested amount to be transferred to an unrestricted account of the user as opposed to accessing the funds comprising the restricted balance. In this example, the payment service may include that the amount of funds requested be available to collateralize an advance offer. In some examples, the payment service can also use other terms, such that the current and projected unrestricted balance of the user's unrestricted account and other holdings to evaluate collateralization of an advance offer.

The method 600*b* may continue at block 612 with balance management component 119 and transactions component 123 determining that at least one of a deposit or a repayment of the amount of funds has not been received. For example, for a predetermined period of time after the amount of funds corresponding to the requested amount are transferred to an unrestricted balance of the user's unrestricted account, the balance management component 119 may monitor the unrestricted balances 134 for existing or incoming unrestricted funds, such as an expected income (e.g., deposits, direct deposits) of the user or a total value of assets (e.g., fiat currency, cryptocurrency, stocks, bonds, ETFs) owned by the user that may be utilized by the transactions component 123. During the predetermined period of time, the balance management component 119 may cause the transactions component 123 to withdraw a portion or all of the amount transferred to the unrestricted account of the user to reimburse the payment service automatically or at the user's direction. The method 600*b* may then conclude at block 612 with the transactions component 123 withdrawing, from the restricted balance, an amount of funds equal to the amount of funds corresponding to the requested amount of funds. For example, in the event that the payment service has not been reimbursed, the transactions component 123 may automatically cause a portion of all of the amount of funds transferred to the unrestricted balance 134 of the user to be withdrawn from the restricted balance 132 of the restricted account of the user and transferred to a balance of the payment service.

Figure 6C:
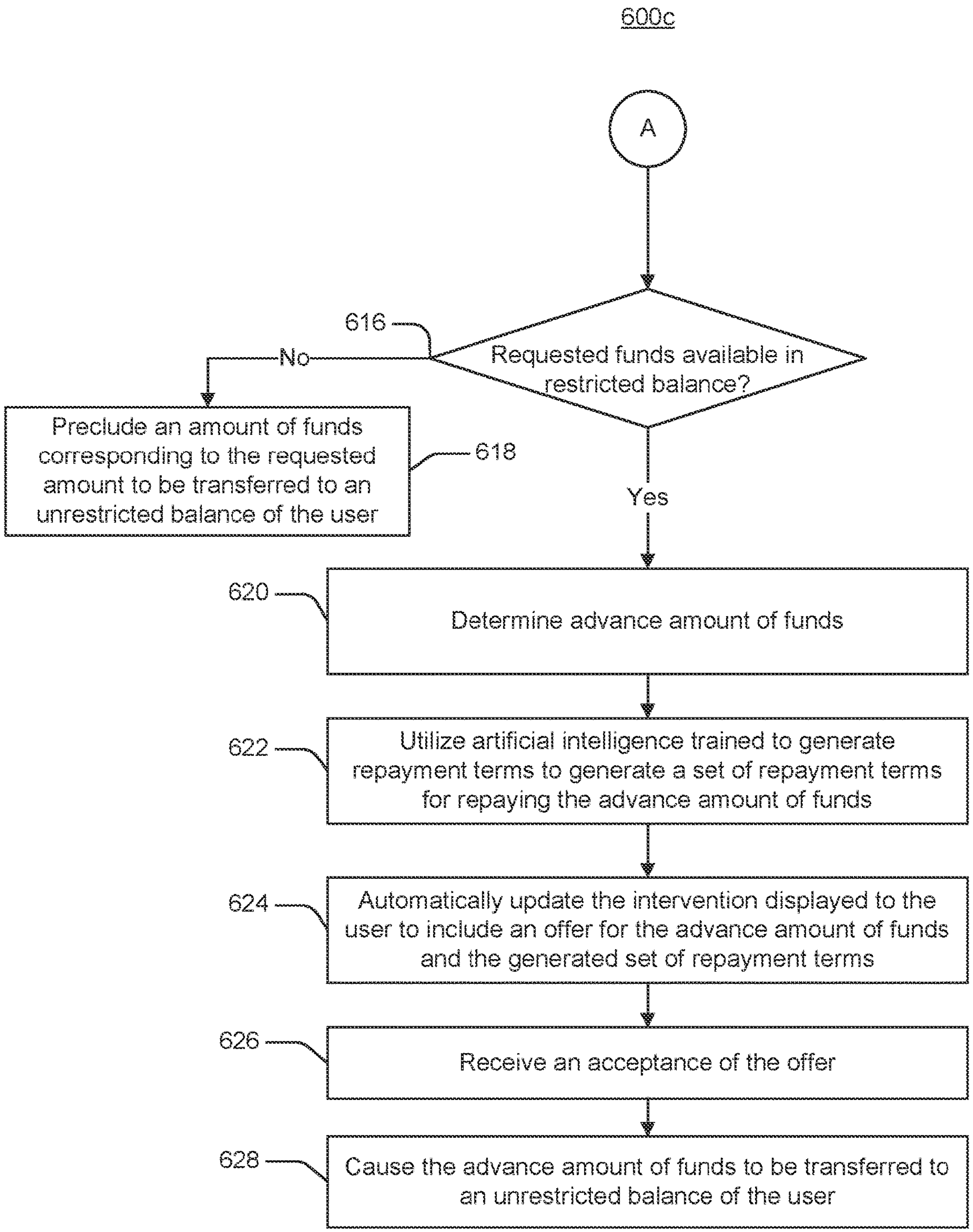
FIG. 6C illustrates a flow diagram of a method for facilitating user access to restricted assets by providing an advance amount and surfacing loan repayment terms according to embodiments disclosed herein.

FIG. 6C illustrates a flow diagram of a method 600*c* for facilitating user access to restricted assets by providing an advance amount and surfacing loan repayment terms, in accordance with presently disclosed embodiments.

The method 600*c* may begin at a placeholder "A," in which the user interface component 117 receives, from a user device 112 associated with a user of the payment service, a request to access an amount of the funds including a restricted balance associated with a restricted account of the user prior to satisfaction of the condition associated with the restricted account. The method 600*c* may continue at decision 616 with the balance management component 119 determining whether the requested amount of funds is available in the restricted balance of the user. For example, the balance management component 119 may access the restricted balances 132 to confirm that the amount of funds of the user in restricted balances 132 may be utilized as collateral to an advance offer for the requested amount of funds. In some examples, the balance management component 119 may access the restricted accounts "Savings" totaling $3000 and "IRA" totaling $10000, for example, and confirm the amount of funds in the restricted balances 132. Based on an output of the balance management component 119 confirming the amount of funds that the user has in the restricted balances 132, the advance offer generating component 120 may then the determine, for example, a maximum amount of funds that may be advanced to the user in response to the requested amount of funds.

In response to determining that the requested funds are not available in the restricted balance of the user, or that an advance offer to the user is not otherwise appropriate by virtue of other available collateral or expected income, the method 600*c* may continue at block 618 with the balance management component 119 and transactions component 123 precluding an amount of funds corresponding to the requested amount to be transferred to an unrestricted balance of the user. In this example, the payment service may require that the amount of funds requested be available to collateralize an advance offer. In some examples, the payment service can also use other terms, such that the current and projected unrestricted balance of the user's unrestricted account and other holdings to evaluate collateralization of an advance offer.

In response to determining that the requested amount of funds is available in the restricted account, the method may continue at block 620 with the advance offer generating component 120 determining an advance amount of funds to offer to the user. As an example, the user may have specified a requested amount of funds when requesting funds from the restricted account. As another example, the advance offer generating component 120 may determine an advance amount of funds that can be collateralized by the funds and other assets currently owned by the user.

The method 600*c* may continue at block 622 with the artificial intelligence component 118 identifying a set of repayment terms for repaying the advance amount of funds generated by the advance offer generating component 120. For example, the advance offer generating component 120 may generate an advance offer to advance an amount of funds and the artificial intelligence component 118 may then identify a set of repayment terms for repaying the advanced amount of funds based on the user transaction data and financial data accessible from the data stores 128 on the payment service system 106. The method 600*c* may continue at block 624 with the user interface component 117 automatically updating the intervention displayed to the user to include an offer for the funds advance generated by the advance offer generating component 120 and the set of repayment terms as identified by the artificial intelligence component 118. In some examples, the user interface component 117 may update the intervention 108, for example, in real-time or near real-time to include both the offer for the advance of funds corresponding to the amount of funds requested as generated by the advance offer generating component 120 along with the identified set of repayment terms as identified by the artificial intelligence component 118.

The method 600*c* may continue at block 626 with the user interface component 117 receiving an acceptance of the offer to automatically cause the funds advance to be transferred to an unrestricted balance of the user. The method 600*c* may conclude at block 628 with the transactions component 123 and user account selection component 121 causing the advance amount of funds to be transferred to an unrestricted balance of the user. In some examples, the user interface component 117 may allow the user to then select and confirm one of the identified sets of repayment terms and the transactions component 123 may cause the agreed-upon amount to be credited to the unrestricted balance 134 associated with the unrestricted balance of the user.

Figure 6D:
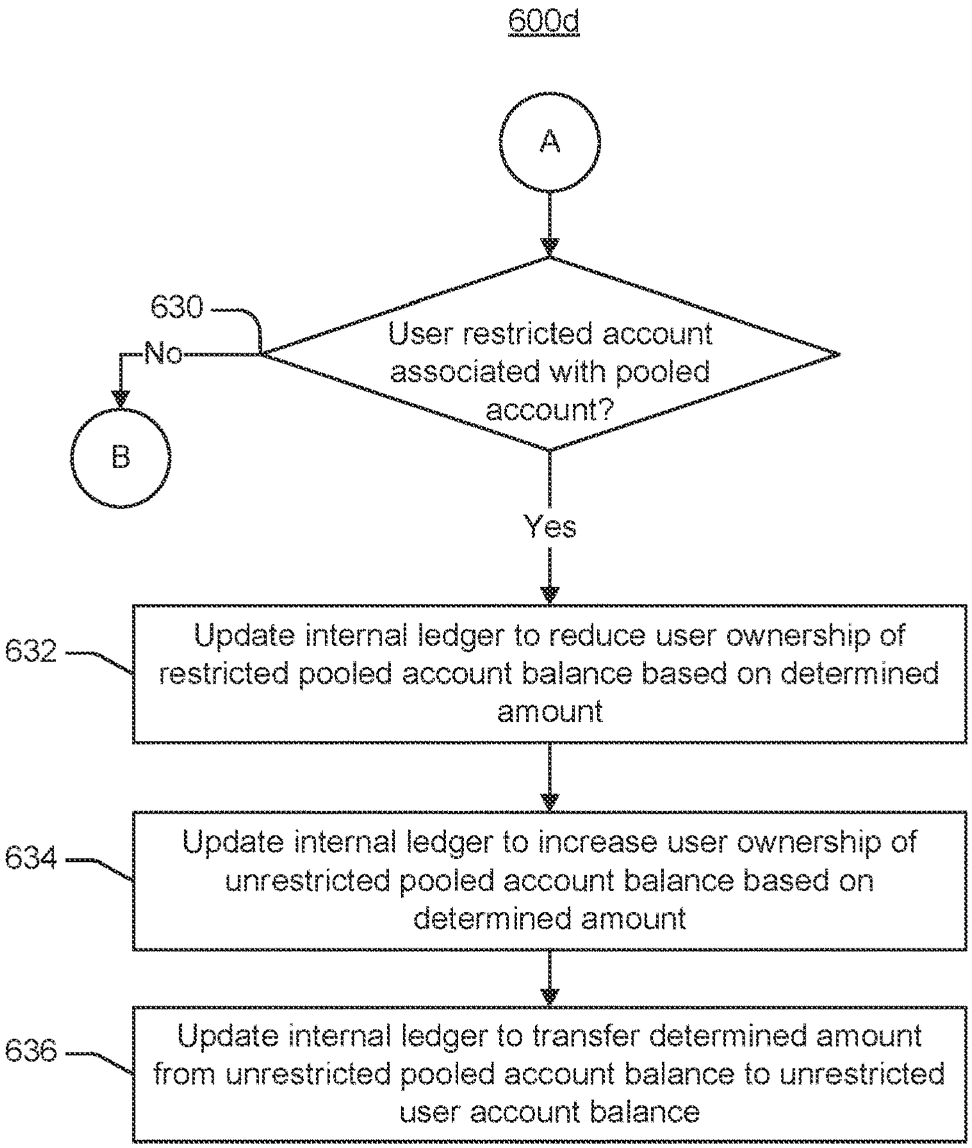
FIG. 6D illustrates a flow diagram of a method for facilitating user access to restricted assets by accessing funds available in pool of assets according to embodiments disclosed herein.

FIG. 6D illustrates a flow diagram of a method 600*d* for facilitating user access to restricted assets by accessing funds available in pool of assets, in accordance with presently disclosed embodiments.

The method 600*d* may begin at placeholder "A" with the user interface component 117 receiving, from a user device 112 associated with a user of the payment service, a request to access an amount of the funds including a restricted balance associated with a restricted account of the user prior to satisfaction of the condition associated with the restricted account. The method 600*d* may continue at decision 630 with the user account selection component 121 determining whether the user's restricted account is associated with a pooled account. In response to determining that the user's restricted account is not associated with the pooled account, the method 600*d* may continue at placeholder "B" to be described below with respect to method 600*e* of FIG. 6E.

For example, when a user requests access to funds that are otherwise denoted as restricted in the ledger system, the payment service system 106 can utilize the ledger system to enable the user to access funds that are associated with an unrestricted state. In some examples, the funds can be reallocated internally (that is to say without involving another external service or system) from other pooled funds or accounts associated with an unrestricted state, so the funds associated with the restricted state are not accessed at the time of the request, and a penalty is not assessed or incurred. In some examples, the other pooled funds or accounts associated with an unrestricted state can be an account managed and/or owned by the payment service system 106. For example, the pooled funds may include a restricted account managed and/or owned by the payment service system 106 in which each user participating in the pooled funds is recorded as having an ownership stake in the pool. Each time funds are advanced to a user, or otherwise allowed to be used by the user, as unrestricted funds, the payment service system 106 may update the ledger to switch the ownership stake back as being owned the payment service system 106.

In response to determining that the user's restricted account is associated with a pooled account (e.g., following the "Yes" path in FIG. 6D), the method 600*d* may continue at block 632 with the transactions component 123 updating an internal ledger to reduce user ownership of a restricted pooled account balance based on determined amount according to techniques described herein. While updating the internal ledger to reduce the user's ownership of the restricted pooled account balance, the payment service system 106 may simultaneously update the internal ledger to increase the payment service's ownership of the restricted pooled account balance. Therefore, the total amount included in the pooled account balance has not changed, but ownership of those amounts has been reallocated. The method 600*d* may continue at block 634 with the transactions component 123 updating an internal ledger to increase user ownership of unrestricted pooled account balance based on determined amount according to techniques described herein. While updating the internal ledger to increase the user's ownership of the unrestricted pooled account balance, the payment service system 106 may simultaneously update the internal ledger to decrease the payment service's ownership of the unrestricted pooled account balance. Therefore, once again, the total amount included in the unrestricted pooled account balance has not changed, but ownership of those amounts has been reallocated.

The method 600*d* may then continue at block 636 with the transactions component 123 updating an internal ledger to transfer the determined amount from an unrestricted pooled account balance to an unrestricted user account balance according to techniques herein. In some examples, the user can access and use funds directly from the unrestricted pooled account balance, in which case the transfer to the user's own unrestricted balance is not performed. In other examples, the user withdraws funds from the pooled account and transfer them to their own unrestricted balance. Once again, these transfers may be performed using one or more internal ledgers and without the involvement of external services or systems, so the total amount under management by the payment service system 106 does not change.

For example, when a user requests to access funds in the restricted account, the user account selection component 121 may select an account corresponding to pooled funds deposited by multiple users on the ledger, and the balance management component 119 may then access the account corresponding to pooled funds in the ledger for the amount of funds requested by the user. The transactions component 123 may then transfer an amount of funds corresponding to the requested amount of funds from the account corresponding to pool funds by decreasing the account corresponding to pooled funds (e.g., restricted balances 132) on the ledger and increasing the unrestricted balances 134 of the user on the ledger to make the requested amount of funds available to the user (e.g., crediting the unrestricted balances 134 associated with the user in the ledger).

In some examples, the balance management component 119 can modify one or more ledgers to enable the user to access the funds in the unrestricted balance. In some examples, the user may have a period of time to replenish the funds before the funds are pulled from the restricted balance. In some examples, the funds may be provided as an advance, such that the amount is transferred to the unrestricted balance 134 of the user for use as unrestricted funds. In some examples, such funds can originate from an account or pooling of funds managed and/or owned by the payment service system 106. In such examples, portions of one or more subsequent deposits (e.g., from direct deposits, tax refunds, peer-to-peer payments, etc.) can be withheld until the payment service system 106 is repaid. If the subsequent deposit(s) are insufficient to repay the payment service system 106 within a period of time, the payment service system 106 can access the amount of funds advanced from a restricted balance of the user. Therefore, using the ledger system described herein, the user is provided access to an unrestricted balance based on exchanging a balance restricted (of pooled funds) without the payment service system reporting to or interacting with a third-party system.

Figure 6E:
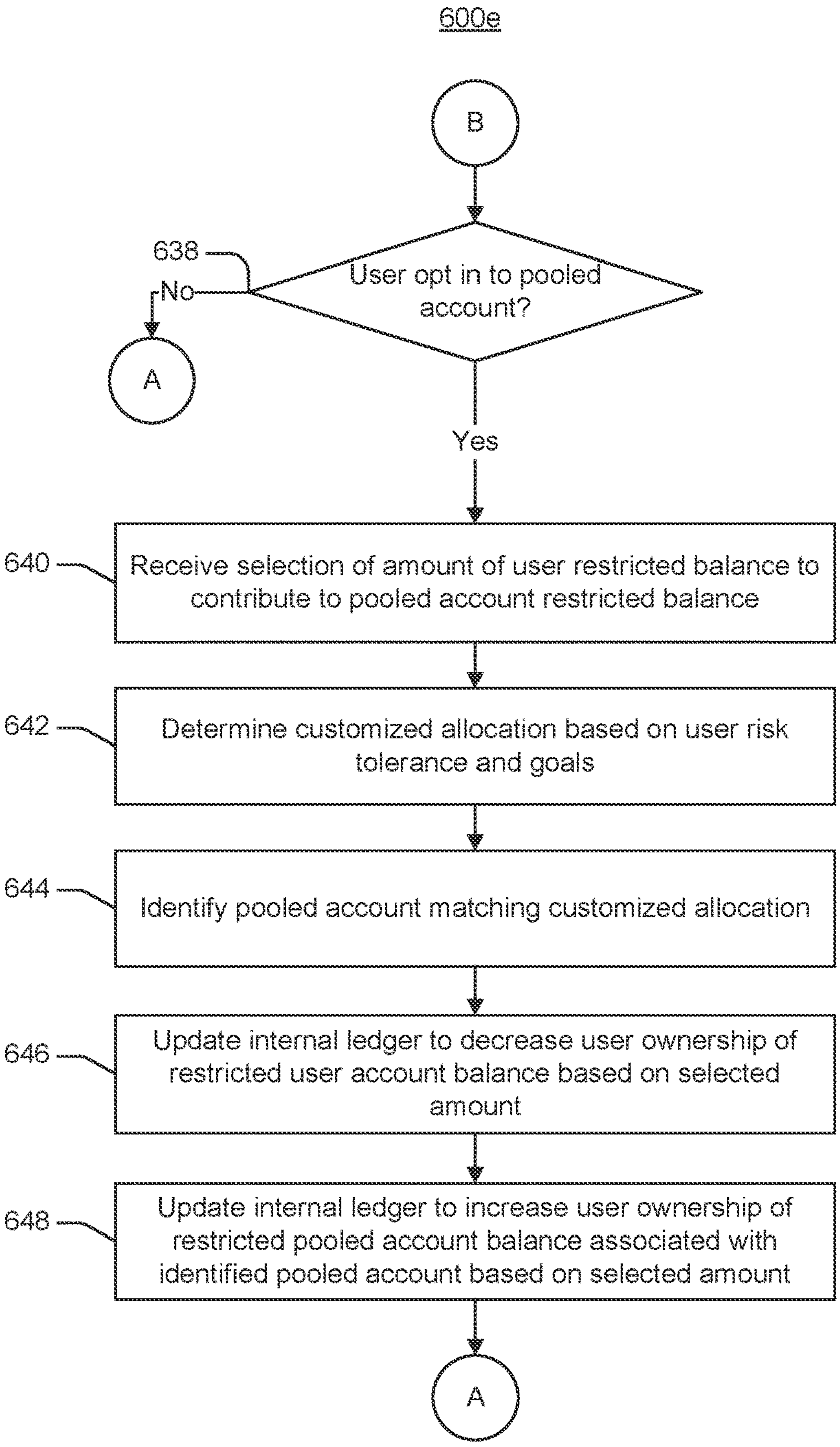
FIG. 6E illustrates a flow diagram of a method for facilitating users to pool funds with a cluster of users according to embodiments disclosed herein.

FIG. 6E illustrates a flow diagram of a method 600*e* for facilitating users pooling funds with a cluster of users, in accordance with presently disclosed embodiments.

The method 600*e* may continue from placeholder "B" continuing from decision 630 of method 600*d* of FIG. 6D with the user account selection component 121 determining that the user's restricted account is not associated with a pooled account. The method 600*e* may continue at decision 632 with the user interface component 117 determining whether the user has opted into the pooled account. As an example, in response to determining that the user's restricted account is not associated with a pooled account, the user interface component 117 may cause a user interface (e.g., user interface 400*a*) to be displayed in the payment service application executing on the user device 112 that enables the user to opt into using a pooled account. In response to determining that the user has not opted into the pooled account, the method 600*e* may continue at placeholder "A" through which the user may select or be presented another method to access the requested funds. If the user has not opted into using a pooled account, then the remainder of the method 600*e* is not available. The payment service system 106, however, can provide one of the other options to access the funds requested at block 602 described, for example, with respect to FIGS. 6A, 6B, 6C, and 6F. This is just one example of how the user can create or opt into using a pooled account and other approaches are possible. For example, the user can opt into using a pooled account from a main or home screen of the payment service application executing on their user device or in response to an invitation or notification from the payment service.

In response to determining that the user has opted into using the pooled account, the method 600*e* may continue at block 640 with the user interface component 117 receiving selection of amount of the user's restricted balance to contribute to the pooled account restricted balance. In some examples, as depicted by user interface 400*a*, the user device 112 may display a notification 402, which may prompt the user to transfer an amount of a funds into a restricted account associated with a pool of funds of a cluster of users. The method 600*e* may then continue at block 642 with the artificial intelligence component 118 determining a customized allocation based on user risk tolerance and goals. In some examples, as previously discussed above with respect to FIGS. 4A-4D, the user interface 400*c* may be used to collect stated preferences from the user to facilitate the application of the artificial intelligence component 118 towards the task of recommending a particular pooled fund to the user.

The method 600*e* may then continue at block 644 with the artificial intelligence component 118 and user account selection component 121 identifying a pooled account that matches the customized allocation determined at block 642. In some examples, the user interface 117 may display a listing of pooled investments 408 that the user may select to participate in. In some examples, based on the selection of the user received by the user interface 117, and, for example, user transaction history data, user purchase history data, user attribute data, user credit history data, user investment profile data, user contextual data, user interaction data, user preference data, or other data privately stored on the payment service system 106, the artificial intelligence component 118 may make a recommendation for the user.

The method 600*e* may then continue at block 646 with the transactions component 123 updating an internal ledger to decrease the user's ownership of the user's restricted account balance based on the selected amount according to techniques described herein. The method 600*c* may then continue at block 648 with the transactions component 123 updating an internal ledger to increase the user's ownership of the restricted pooled account balance associated with identified pooled account based on selected amount according to techniques described herein. The method 600*c* may continue through to placeholder "A," through which the user may retrieve funds from the pooled account according to the method 600*d*.

Figure 6F:
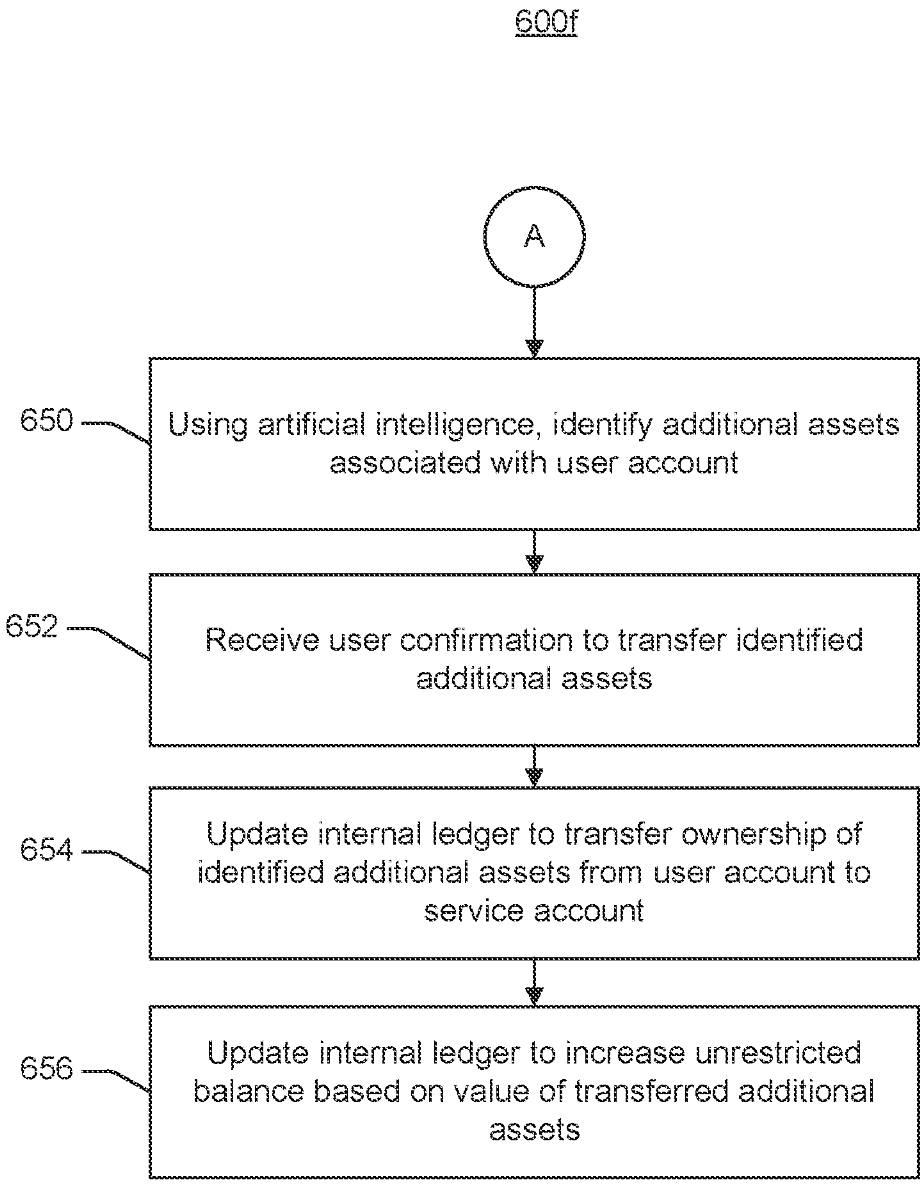
FIG. 6F illustrates a flow diagram of a method for identifying pooling assets and/or a cluster of users for a user to pool an amount of funds therewith according to embodiments disclosed herein.

FIG. 6F illustrates a flow diagram of a method 600*f* for identifying pooling assets and/or a cluster of users for a user to pool an amount of funds therewith, in accordance with presently disclosed embodiments.

The method 600*f* may continue from placeholder "A" at block 650 with the artificial intelligence component 118 identifying additional assets associated with user account that could be sold or liquidated to generate the requested amount of funds. For example, the artificial intelligence component 118 may access information such as most recent tax data to evaluate the impact of liquidating assets such as cryptocurrency or securities associated with the user. In some examples, the artificial intelligence component 118 may be trained to evaluate the user's non-fiat holdings (e.g., security assets, cryptocurrency, etc.), tax information associated with those holdings (e.g., date of purchase, length of time held, value gained or lost) and generate a recommendation for whether the user can liquidate those assets to access funds in the unrestricted balances 134 as opposed to incurring penalties from withdrawing funds from the restricted balances 132.

The method 600*f* may then continue at block 652 with the user interface component 117 receiving user confirmation to transfer the identified additional assets. The method 600*f* may then continue at block 654 with the transactions component 123 updating an internal ledger to transfer ownership of the identified additional assets from the user's account to a service account of the payment service according to techniques described herein. The method 600*f* may then continue at block 656 with the transactions component updating the internal ledger to increase the unrestricted balance of the user based on the value of the transferred additional assets according to techniques described herein. Specifically, the transactions component 123 may update the internal ledger by an amount of funds corresponding to the value of the transferred additional assets by decreasing the value of the additional assets of the user in the ledger and increasing a value of unrestricted balances 134 of the user in the ledger to make the value of the transferred additional assets available to the user for use.

Figure 7:
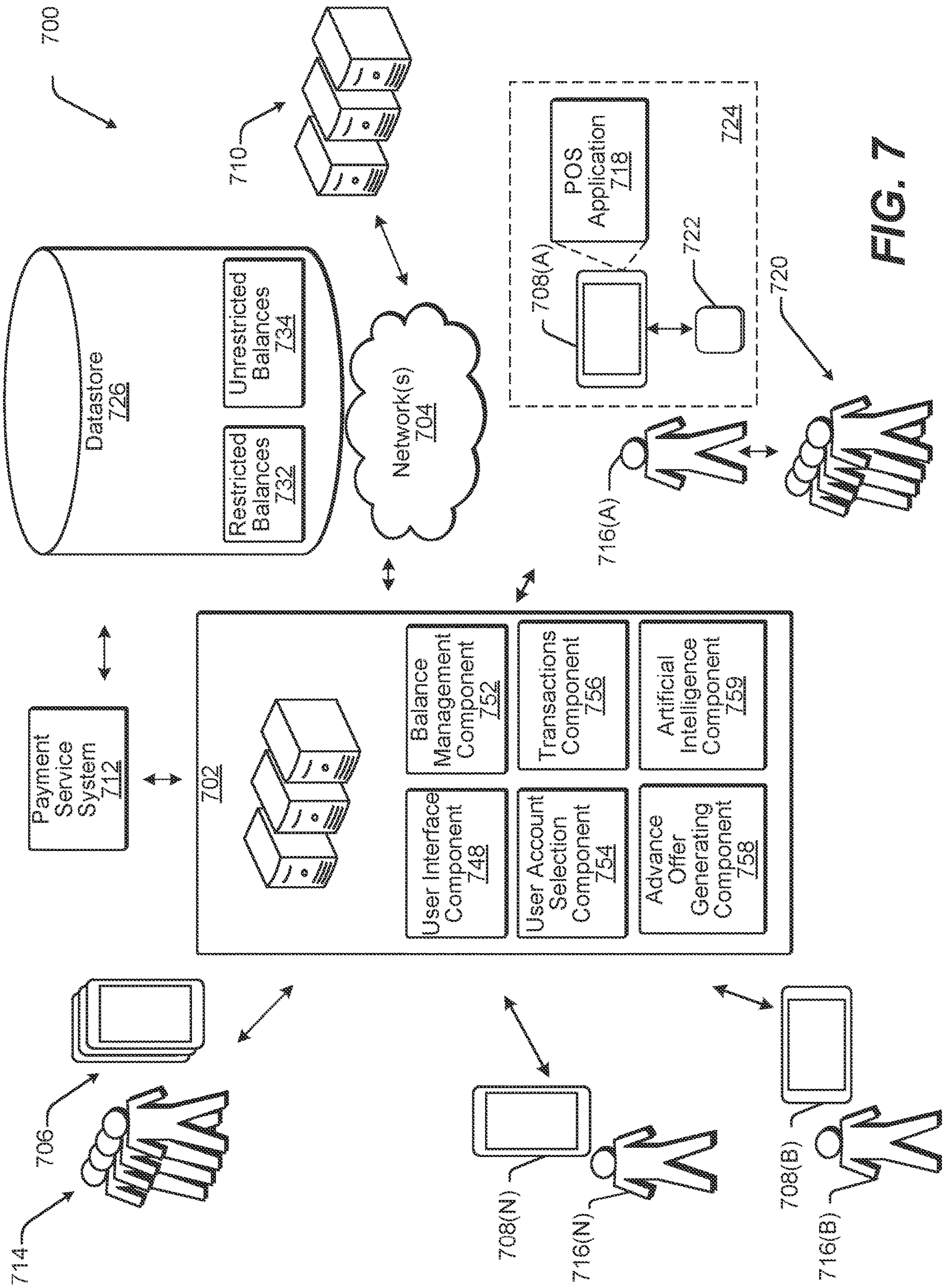
FIG. 7 illustrates an example environment for providing embodiments described herein.

FIG. 7 illustrates an example environment 700. The environment 700 includes server(s) 702 that can communicate over a network 704 with user devices 706 (which, in some examples can be merchant devices 708 (individually. 708(A)-708(N))) and/or server(s) 710 associated with third-party service provider(s). The server(s) 702 can be associated with a service provider that can provide one or more services for the benefit of users 714, as described below. Actions attributed to the service provider can be performed by the server(s) 702.

Certain elements of environment 100 described with respect to FIG. 1 correspond to similar elements described herein with respect to FIG. 7. For example, the server(s) 702 can correspond to server(s) 104, the network(s) 704 can correspond to the network(s) 101, the user device(s) 706 can correspond to the user device(s) 112, payment service system 712 can correspond to payment service system 106 discussed in conjunction with FIG. 1, etc.

Similar to server(s) 104, servers 702 can store one or more functional components that enable the payment service to perform operations as described herein. For example, the server(s) 702 can store a user interface component 848, a balance management component 750, a user account selection component 754, an advance offer generating component 756, a transactions component 758, and artificial intelligence component 759. Each component can function similarly to the respective components described in FIG. 1. In some examples, the payment service system 712 can store one or more functional components that enable the payment service to perform operations as described herein.

The environment 700 may include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706.

In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 may include merchants 716 (individually, 716(A)-716(N)). In an example, the merchants 716 can operate respective merchant devices 708, which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., pop-up shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 stored thereon. The POS application 718 can configure the merchant device 708 as a POS terminal, which enables the merchant 716(A) to interact with one or more customers 720. As described above, the users 714 may include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data may include payment information, which can be obtained from a reader device 722 associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. Additional details are described below with reference to FIG. 10. In some examples, the reader device 722 can read information from alternative payment instruments including, but not limited to, wristbands and the like.

In some examples, the reader device 722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device).

In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument.

While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 720 may tap or hover his or her payment instrument (e.g., card, user device such as a smart phone running a payment service application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®), VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

The payment service 712 can access a datastore 726 (e.g., datastore 128) to access data regarding one or more restricted balances 132 or unrestricted balances 134 associated with restricted accounts or unrestricted accounts, respectively, of one or more user.

As described above, the server(s) 710, which can be associated with payment service provider(s), may determine whether the transaction is authorized based on the transaction data, as well as information relating to parties to the transaction (e.g., the customer 720 and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits its funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfillment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which may include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally, and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally, or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time.

In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 710). That is, the service provider can offer IDV services to verify the identity of users 714 seeking to use or using their services. Identity verification requests a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or the server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with server(s) 702 of the service provider. That is, techniques described herein are directed to a specific implementation—or, a practical application—of utilizing a distributed system of user devices 706 that are in communication with server(s) 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time.

Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
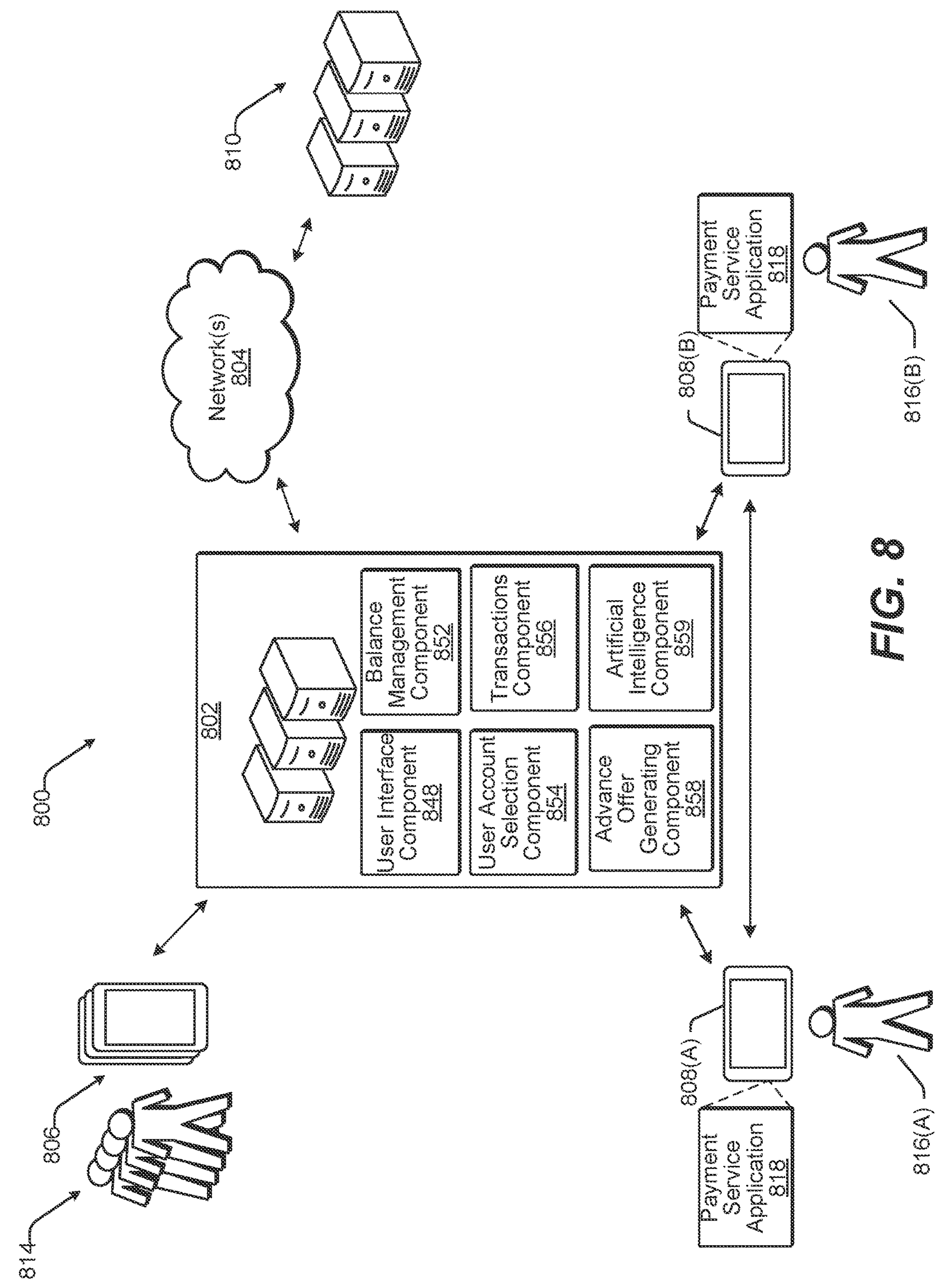
FIG. 8 illustrates another example environment for providing embodiments described herein.

FIG. 8 illustrates an example environment 800. The environment 800 includes server(s) 802 that can communicate over a network 804 with user devices 806 (which, in some examples can be user devices 808 (individually, 808(A), 808(B)) and/or server(s) 810 associated with third-party service provider(s). The server(s) 802 can be associated with a service provider that can provide one or more services for the benefit of users 814, as described below. Actions attributed to the service provider can be performed by the server(s) 802. In some examples, the service provider referenced in FIG. 7 can be the same or different than the service provider referenced in FIG. 8.

Certain elements of environment 100 described with respect to FIG. 1 correspond to similar elements described herein with respect to FIG. 8. For example, the server(s) 802 can correspond to server(s) 104, the network(s) 804 can correspond to the network(s) 101, the user device(s) 806 can correspond to the user device(s) 112, discussed in conjunction with FIG. 1, etc.

Similar to server(s) 104, servers 802 can store one or more functional components that enable the payment service to perform operations as described herein. For example, the server(s) 802 can store a user interface component 848, a balance management component 850, a user account selection component 854, an advance offer generating component 856, a transactions component 858, and artificial intelligence component 859. Each component can function similarly to the respective components described in FIG. 1. The servers 802 can access a datastore 826 (e.g., datastore 128) to access data regarding one or more restricted balances 132 or unrestricted balances 134 associated with restricted accounts or unrestricted accounts, respectively, of one or more user.

The environment 800 may include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on.

The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment service application 818 (or other access point) installed on devices 806 configured for operation by users 814. In an example, an instance of the payment service application 818 executing on a first device 808(A) operated by a payor (e.g., user 816(A)) can send a request to the service provider to transfer an asset (e.g., fiat currency, non-fiat currency, digital assets, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 9:
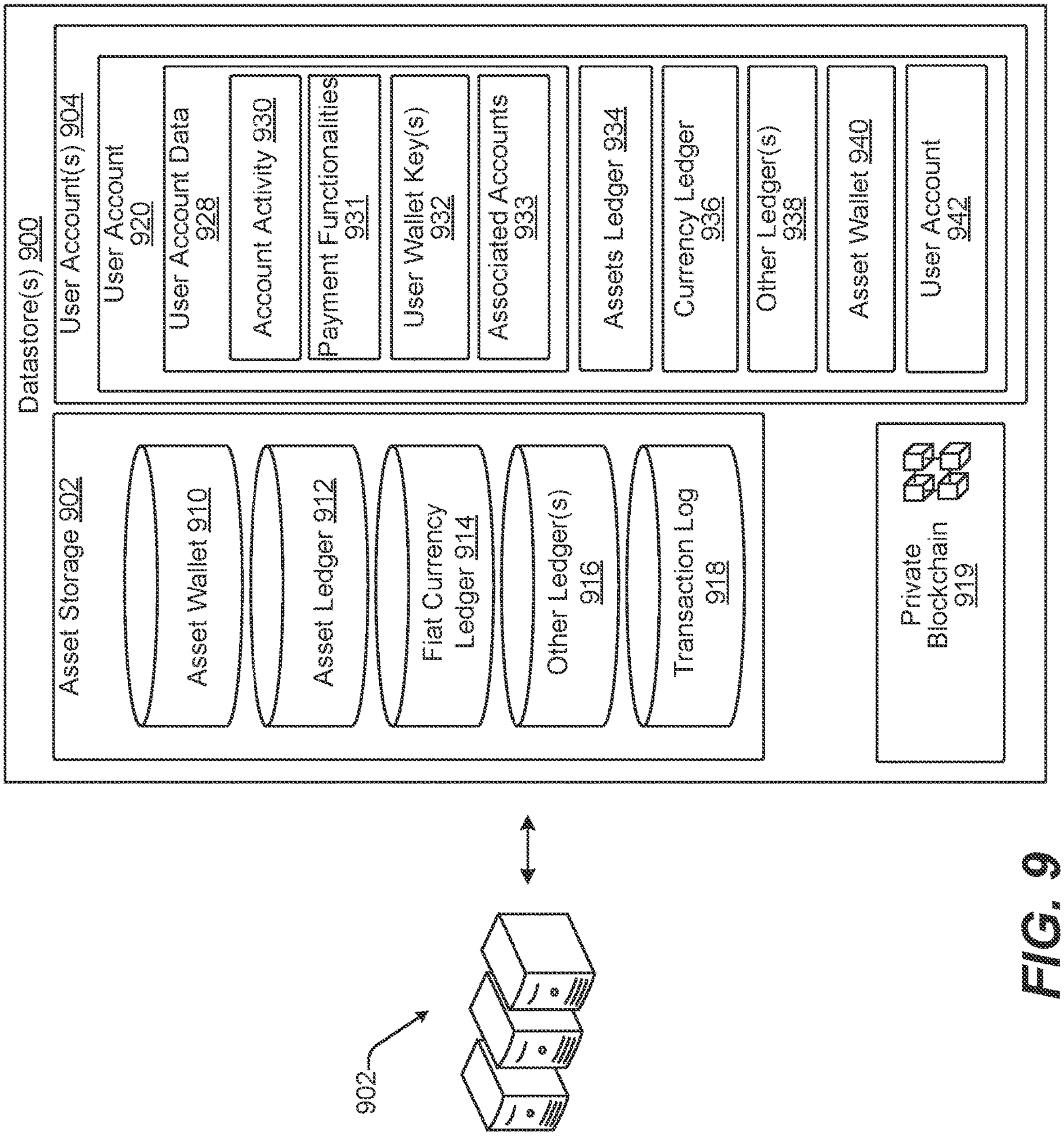
FIG. 9 illustrates an example datastore for providing embodiments described herein.

In some examples, the service provider can utilize a ledger system to track transfers of assets between users 814. FIG. 9, below, provides additional details associated with such a ledger system. The ledger system can enable users 814 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment service application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment service application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some examples, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax may include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment service application 818 executing on the user devices 806. In at least some examples, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page may include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations.

The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some examples, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application may include, for example, a text messaging application for communication between phones (e.g., conventional mobile telephones or smartphones), or a cross-platform instant messaging application for smartphones and phones that use the Internet for communication.

The messaging application can be executed on a user device 806 (e.g., mobile device or conventional personal computer (PC)) based on instructions transmitted to and from the server(s) 802 (which, in such an example can be called a "messaging server"). In some instances, the messaging application may include a payment service application with messaging capability that enables users of the payment service application to communicate with one another. In such instances, the payment service application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 814 to transfer fiat currency, non-fiat currency, cryptocurrency, securities, or other assets, or portions thereof, to other users 814. In at least one example, individual users can be associated with accounts. Additional details associated with accounts and the transfer of assets between users 814 are described below with reference to FIG. 9.

Furthermore, the service provider of FIG. 8 can enable users 814 to perform banking transactions via instances of the payment service application 818. For example, users can configure direct deposits or other deposits for adding assets to their various ledgers/balances. Further, users 814 can configure bill pay, recurring payments, and/or the like using assets associated with their accounts. In addition to sending and/or receiving assets via peer-to-peer transactions, users 814 buy and/or sell assets via asset networks such as cryptocurrency networks, securities networks, and/or the like.

FIG. 9 illustrates example datastore(s) 900 that can be associated with the server(s) 802.

In at least one example, the datastore(s) 900 can store assets in an asset storage 902, as well as data in account(s) 904. In some examples, account(s) 904 may include merchant account(s) 906, and/or customer account(s) 908. In at least one example, the asset storage 902 can be used to store assets managed by the service provider of FIG. 8. In at least one example, the asset storage 902 can be used to record whether individual of the assets are registered to users. For example, the asset storage 902 may include an asset wallet 910 for storing records of assets owned by the service provider of FIG. 8, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 810 can be associated therewith. In some examples, the asset wallet 910 can communicate with the asset network via one or more components associated with the server(s) 802.

The asset wallet 910 can be associated with one or more addresses and can vary addresses used to acquire assets (e.g., from the asset network(s)) so that its holdings are represented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 may include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 902 may contain ledgers that store records of assignments of assets to users 814. Specifically, the asset storage 902 may include asset ledger 910, fiat currency ledger 914, and other ledger(s) 916, which can be used to record transfers of assets between users 814 of the service provider and/or one or more third-parties (e.g., merchant network(s), payment card network(s), ACH network(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more account(s) 904.

In at least one example, the asset storage 902 may include transaction logs 918, which may include records of past transactions involving the service provider of FIG. 8. In at least one example, transaction data, as described herein, can be stored in association with the transaction logs 918.

In some examples, the datastore(s) 900 can store a private blockchain 919. A private blockchain 919 can function to record sender addresses, recipient data, public keys, values of cryptocurrency transferred, and/or can be used to verify ownership of cryptocurrency tokens to be transferred. In some examples, the service provider of FIG. 8 can record transactions taking place within the service provider of FIG. 8 involving cryptocurrency until the number of transactions has exceeded a determined limit (e.g., number of transactions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public blockchain. In at least one example, the service provider of FIG. 8 can participate as miner(s) at least for its transactions to be posted to the public blockchain.

In at least one example, the datastore(s) 900 can store and/or manage accounts, such as account(s) 904, merchant account(s) 906, and/or customer account(s) 908. In at least one example, the account(s) 904 may store records of accounts associated with the users 814. In at least one example, the account(s) 904 may include an account 920, which can be associated with a user (of the users 814). Other accounts of the account(s) 904 can be similarly structured to the account 920, according to some examples. In other examples, other accounts may include more or less data and/or account information than that provided by the account 920.

In at least one example, the account 920 may include account data 928, which may include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the account data 928 may include account activity 930 and user wallet key(s) 932. The account activity 930 may include a transaction log for recording transactions associated with the account 920. In some examples, the user wallet key(s) 932 may include a public-private key-pair and a respective address associated with the asset network or other asset networks. In some examples, the user wallet key(s) 932 may include one or more key pairs, which can be unique to the asset network or other asset networks.

In addition to the account data 928, the account 920 may include ledger(s) for account(s) managed by the service provider of FIG. 8, for the user. For example, the account 920 may include an assets ledger 934, a currency ledger 936, and/or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the assets ledger 934 can store a balance for each of one or more cryptocurrencies (e.g., Bitcoin, Ethereum, Litecoin, etc.) registered to the account 920. In at least one example, the assets ledger 934 can further record transactions of cryptocurrency assets associated with the account 920. For example, the account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until an account requests such. This on-the-fly wallet key generation provides enhanced security features for users, reducing the number of access points to an account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in assets ledger 934), by purchasing currency in the form associated with the account using currency in a different form (e.g., buying a value of cryptocurrency from the service provider of FIG. 8 using a value of fiat currency reflected in currency ledger 936, and crediting the value of cryptocurrency in assets ledger 934), or by conducting a transaction with another user (customer or merchant) of the service provider of FIG. 8.

The account receives incoming currency (which can be in the form associated with the account or a different form, in which the incoming currency may be converted to the form associated with the account). In some examples, the account data 928 may include preferences for maintaining balances of individual of the ledgers. For example, the service provider of FIG. 8 can automatically debit the currency ledger 936 to increase the assets ledger 934, or another account associated with the user whenever the cryptocurrency balance (e.g., of the assets ledger 934) falls below a stated level (e.g., a threshold). Conversely, in some examples, the service provider of FIG. 8 can automatically credit the currency ledger 936 to decrease the assets ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can request the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's assets ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source. In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8.

In some examples, the service provider of FIG. 8 may include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the assets ledger 934 of the user. Additionally, while the service provider of FIG. 8 recognizes that the user retains the value of the transferred cryptocurrency through crediting the assets ledger 934, any person that inspects the blockchain will see the cryptocurrency as having been transferred to the service provider of FIG. 8. In some examples, the asset wallet 910 can be associated with many different addresses. In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's assets ledger 934, currency ledger 936, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the assets ledger 934. In some examples, a user can receive fiat currency or another currency in the form of payment for a transaction with another user. In at least one example, at least a portion of such funds can be converted into cryptocurrency by the service provider of FIG. 8 and used to fund the assets ledger 934 of the user.

As addressed above, in some examples, users can also have other accounts maintained by the service provider of FIG. 8. For example, a user can also have an account in U.S. dollars, which can be tracked, for example, via the currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the currency ledger 936.

In some examples, a user can have one or more internal payment cards registered with the service provider of FIG. 8. Internal payment cards can be linked to one or more of the accounts associated with the account 920. In some examples, options with respect to internal payment cards can be adjusted and managed using an application (e.g., the payment service application 818).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the account 920 can be associated with an asset wallet 940. The asset wallet 940 of the user can be associated with account information that can be stored in the account data 928 and, in some examples, can be associated with the user wallet key(s) 932. In at least one example, the asset wallet 940 can store data indicating an address provided for receipt of a cryptocurrency transaction. In at least one example, the balance of the asset wallet 940 can be based at least in part on a balance of the assets ledger 934. In at least one example, funds availed via the asset wallet 940 can be stored in the asset wallet 940 or the asset wallet 910. Funds availed via the asset wallet 910 can be tracked via the assets ledger 934. The asset wallet 940, however, can be associated with additional cryptocurrency funds.

In at least one example, when the service provider of FIG. 8 includes a private blockchain 919 for recording and validating cryptocurrency transactions, the asset wallet 940 can be used instead of, or in addition to, the assets ledger 934. For example, at least one example, a merchant can provide the address of the asset wallet 940 for receiving payments. In an example where a customer is paying in cryptocurrency and the customer has their own cryptocurrency wallet account associated with the service provider of FIG. 8, the customer can send a message signed by its private key including its wallet address (i.e., of the customer) and identifying the cryptocurrency and value to be transferred to the merchant's asset wallet 940.

The service provider of FIG. 8 can complete the transaction by reducing the cryptocurrency balance in the customer's cryptocurrency wallet and increasing the cryptocurrency balance in the merchant's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the assets ledger 934 and/or asset wallet 940 are each described above with reference to cryptocurrency, the assets ledger 934 and/or asset wallet 940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 8 is an aspect of the technology disclosed that enables technical advantages of increased processing speed and improved security.

In some examples, the datastore(s) 900 may also include any number of ledgers 934, 936, and 938 that may be iteratively updated in real-time or near real-time in accordance with various user or payment service transactions. For example, a user profile may also include a ledger for any accounts managed by the datastore(s) 900 on behalf of the user. It will be appreciated that users having accounts managed by the datastore(s) 900 is an aspect of the technology that enables technical advantages of increased processing speed and improved security. For example, the user profile may include a currency ledger 936. The currency ledger 936 may store a balance (e.g., unrestricted balance 134) for each of one or more currencies (e.g., US dollar, Euro, bitcoin) that the user owns. The user profile may also include an assets ledger 934. The assets ledger 934 may store a balance for each of one or more security assets (e.g., stocks, bonds, futures) that the customer owns. The user profile may also include a cryptocurrency ledger. The cryptocurrency ledger may store a balance for each of one or more cryptocurrencies that the customer owns. The user profile may also include a loan ledger, the loan ledger may store a balance that the user owes or is owed, and the corresponding terms, for each of one or more loans taken by the user or offered by the user to other users. The ledgers may utilize any suitable data structure.

In some examples, a separate ledger may be used to record information about each individual asset owned by the user. Various ledgers associated with a particular user may be stored all together, in groups, or separately. As another example and not by way of limitation, the currency ledger 936, assets ledger 934, cryptocurrency ledger, and loan ledger, may be logical ledgers. The balances associated with the ledgers may all be saved in a single file, data set, or data store. In other words, a user's ownership interest in multiple types of assets may all be recorded in a composite ledger or be separated recorded in multiple ledgers. In some examples, where one or more instances on a single ledger is used for indicating individual ownership of portions of an aggregate of assets that is otherwise purchased, managed, and/or held by the payment service, the one or more instances on the single ledger can represent "pooled" assets as used herein.

Each user account ledger may reflect a positive balance when a user funds the accounts. An account may be funded by transferring currency in the form associated with the account from an external account (e.g., transferring a quantity of cash to the payment service and the value is credited as a balance in currency ledger 936), or by purchasing currency in the form associated with the account from the datastore(s) 900 using currency in a different form (e.g., buying a value of cryptocurrency from datastore(s) 900 using a value of fiat currency, and crediting the value of cryptocurrency in a currency ledger 936), or by conducting a transaction with another user of the datastore(s) 900 wherein the account receives incoming currency. An account may be funded by purchasing security assets via the datastore(s) 900. When a user requests to purchase security assets from the payment service, the payment service may debit a balance stored in the currency ledger 936 and credit a balance stored in the assets ledger 934. In some examples, a user profile may include preference settings as to a quantity of security assets to keep.

As an example, and not by way of limitation, the datastore(s) 900 may automatically cause a sale of security assets (or other assets) for the user, thus debiting the assets ledger 934 (or other corresponding ledger) and crediting the currency ledger 936. As an example, the transactions component 123 may cause these operations upon receiving instructions from the user or acting on prior authorization of the user. As another example, the transactions component 123 may cause automatic sales of assets when the datastore(s) 900 determines a risk index associated with the security assets owned by the user exceeds a threshold value. As another example and not by way of limitation, the transactions component 123 may automatically cause a purchase of security assets by the user when a balance associated with the assets ledger 934 drops below a stated level. The user profile may also comprise preference settings as to a preferred asset for payments (e.g., a preference to use a particular security asset to pay for day-to-day transactions).

The datastore(s) 900 may also enter into contractual relationships with one or more sources such that the sources provide liquidity of security assets to the payment service. The datastore(s) 900 may maintain a currency ledger 936 recording a quantity of cash or other currencies held by the datastore(s) 900, an assets ledger 934 recording a quantity of security assets held by the datastore(s) 900, and other appropriate ledgers recording a quantity of other assets or obligations (e.g., loans payable) held by the datastore(s) 900. The currency ledger 936 and the assets ledger 934 may also specify the portion of the assets held by the datastore(s) 900 that is owned by one or more users of the datastore(s) 900 and the portion of the assets that is owned by the datastore(s) 900. When the datastore(s) 900 has its own holdings of security assets, user may acquire security assets directly from the datastore(s) 900. In some examples, the datastore(s) 900 may use artificial intelligence, including computational models or algorithms, to dynamically and intelligently control buying and selling activities with respect to security assets and other assets. The algorithms may be designed for maintaining the assets owned by the datastore(s) 900 at a desired level. The desired level may be based on a volume of transactions over a period, balances of collective ledgers in user profiles, exchange rates, or trends in prices of security assets and other assets.

Figure 10:
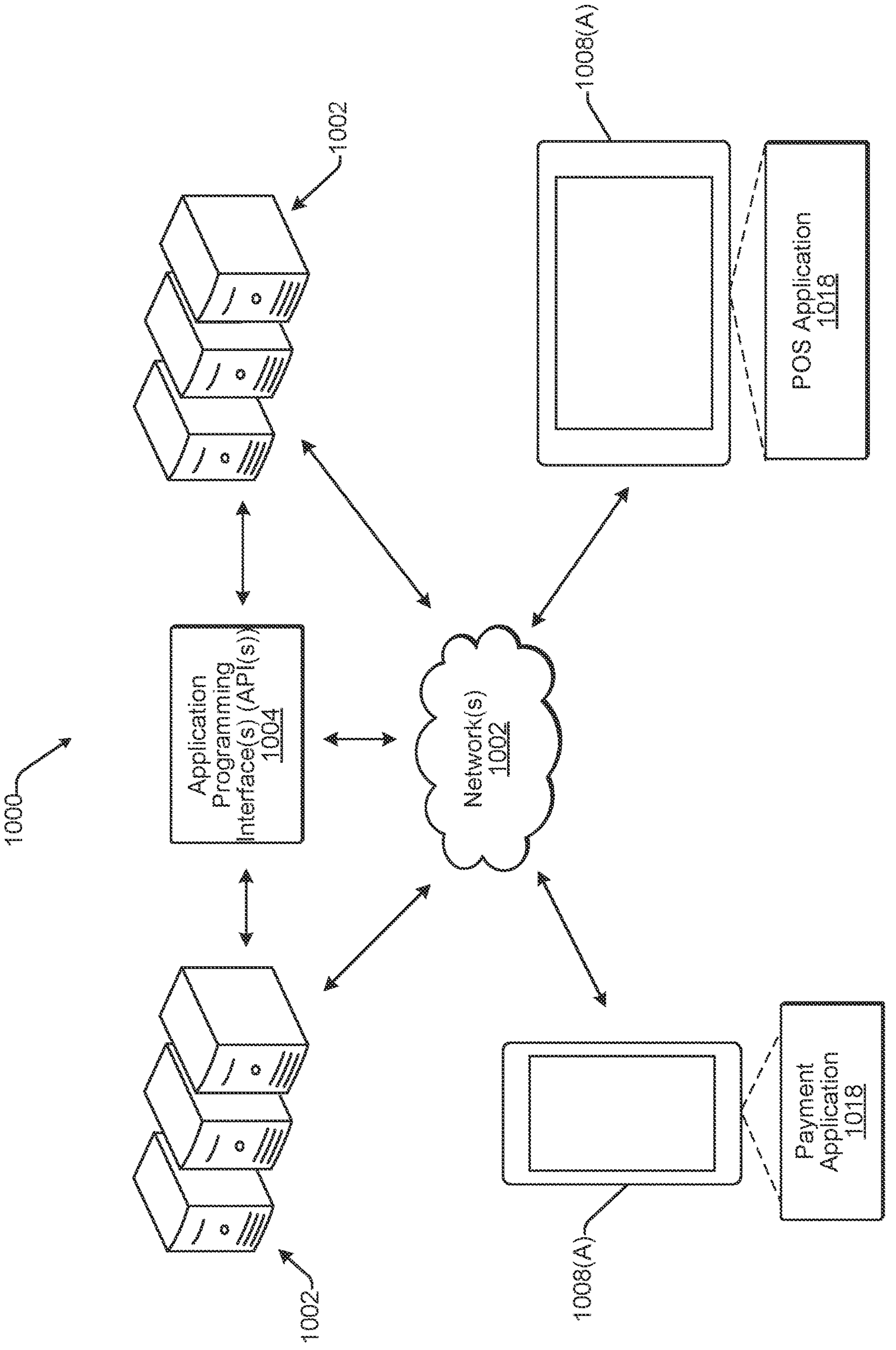
FIG. 10 illustrates another example environment for providing embodiments described herein.

FIG. 10 illustrates an example environment 1000 wherein the environment 700 and the environment 800 can be integrated to enable payments at the point-of-sale using assets associated with accounts in the peer-to-peer environment of FIG. 8. As illustrated, each of the components can communicate with one another via one or more networks 1002. In some examples, one or more APIs 1004 or other functional components can be used to facilitate such communication.

In at least one example, the example environment 1000 can enable contactless payments, via integration of peer-to-peer payment, or other payment making, platform(s) and payment processing platform(s), are described herein. For the purpose of FIG. 10, the environment 700 can refer to a payment processing platform and the environment 800 can refer to a peer-to-peer payment, or payment making, platform. In an example, such an integration can enable a customer to participate in a transaction via their own computing device instead of interacting with a merchant device of a merchant, such as the merchant device 708(A). In such an example, the POS application 718, associated with a payment processing platform and executable by the merchant device 708(A) of the merchant, can present a Quick Response (QR) code, or other code that can be used to identify a transaction (e.g., a transaction code), in association with a transaction between the customer and the merchant. The QR code, or other transaction code, can be provided to the POS application 718 via an API associated with the peer-to-peer payment platform. In an example, the customer can utilize their own computing device, such as the user device 808(A), to capture the QR code, or the other transaction code, and to provide an indication of the captured QR code, or other transaction code, to server(s) 702 and/or server(s) 802.

Based at least in part on the integration of the peer-to-peer payment platform and the payment processing platform (e.g., via the API), the server(s) 702 and/or 802 associated with each can exchange communications with each other—and with a payment service application 818 associated with the peer-to-peer payment platform and/or the POS application 718—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 718 and the payment service application 818, as described herein, can process a payment transaction by routing information input via the merchant application to the payment service application for completing a "frictionless" payment. This can be referred to as "in-application payment." In another example of "in-application payment," the payment service application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 708(A) can present a QR code, or other transaction code, that can be associated with a peer-to-peer payment platform. The customer can use a camera associated with the user device 808(A) to scan, or otherwise capture, the QR code.

If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 718 can cause a text message with a resource locator (e.g., uniform resource locator (URL)) that can be associated with a peer-to-peer payment platform to be sent to the user device 808(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform.

This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 808(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform.

As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 718 of a merchant device 708(A) at a brick-and-mortar store of a merchant to a payment service application 818 of a user device 808(A) of a customer to enable the customer to participate in a transaction via their own computing device. For instance, in a "scan to pay" example as described above, based at least in part on capturing the QR code, or other transaction code, via the user device 808(A), the payment processing platform can provide transaction data to the peer-to-peer payment platform for presentation via the payment service application 818 on the user device 808(A). In some examples, the customer can watch items being added to their cart (e.g., via a user interface presented via the payment service application).

As an item is added to a virtual cart by the merchant—via the POS application 718 on the merchant device 708(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment service application 818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 808(A) during or after payment of the transaction.

In some examples, based at least in part on capturing the QR code, or other transaction code, the payment processing platform can provide transaction data to the peer-to-peer payment platform for presentation via the payment service application 818 on the computing device of the customer, such as the user device 808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer.

In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment service application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection.

In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment service application 818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment service application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment service application 818 (e.g., instead of a native camera, or other sensor), techniques described herein can utilize an indication of the QR code, or other transaction code, received from the payment service application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device.

For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 11:
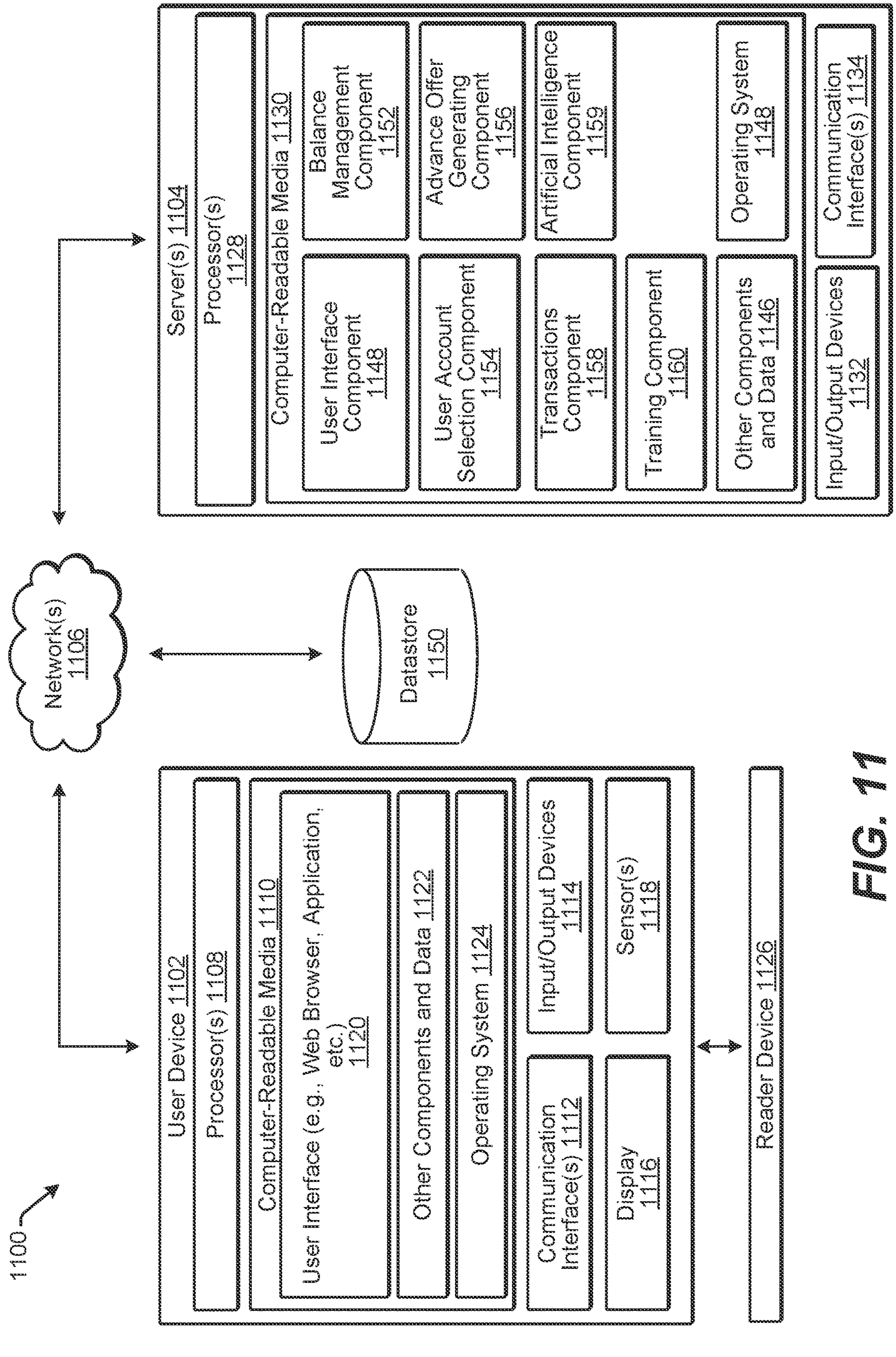
FIG. 11 illustrates an example computer system for providing embodiments described herein.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 7.

Certain elements of environment 100 described with respect to FIG. 1 correspond to similar elements described herein with respect to FIG. 11. For example, the server(s) 1104 can correspond to server(s) 104, the network(s) 1106 can correspond to the network(s) 101, the user device(s) 1102 can correspond to any of the user device(s) 112, the datastore 1150 can correspond to datastore 118, etc.

Similar to server(s) 104, servers 1104 can store one or more functional components that enable the payment service to perform operations as described herein. For example, the server(s) 1104 can store user interface component 1148 (which may function similarly to user interface component 117), balance management component 1152 (which may function similarly to balance management component 119), user account selection component 1154 (which may function similarly to user account selection component 111), advance offer generating component 1156 (which may function similarly to advance offer generating component 120), a transactions component 1158 (which may function similarly to transaction component 123), and an artificial intelligence component 1159 (which may function similarly to artificial intelligence component 118). Each component can function similarly to the respective components described in FIG. 1.

In at least one example, the user device 1102 can be any suitable type of computing device, e.g., portable, semi-portable, semi-stationary, or stationary. Some examples of the user device 1102 may include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 may include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and may include volatile and nonvolatile memory and/or removable and non-removable media implemented in any type of technology for storage of information such as computer-readable processor-executable instructions, data structures, program components or other data. The computer-readable media 1110 may include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 may include a user interface 1120 to enable users to interact with the user device 1102, and thus the server(s) 1104 and/or other networked devices. In at least one example, the user interface 1120 can be presented via a web browser, or the like.

In other examples, the user interface 1120 can be presented via an application, such as a mobile application or desktop application, which can be provided by a service provider associated with the server(s) 1104, or which can be an otherwise dedicated application. In some examples, the user interface 1120 can be FIGS. 2A-3. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

Depending on the type of the user device 1102, the computer-readable media 1110 can also optionally include other functional components and data, such as other components and data 1122, which may include programs, drivers, etc., and the data used or generated by the functional components. In addition, the computer-readable media 1110 can also store data, data structures and the like, that are used by the functional components. Further, the user device 1102 may include many other logical, programmatic and physical components, of which those described are merely examples that are related to the discussion herein.

In at least one example, the computer-readable media 1110 may include additional functional components, such as an operating system 1124 for controlling and managing various functions of the user device 1102 and for enabling basic user interactions.

The communication interface(s) 1112 may include one or more interfaces and hardware components for enabling communication with various other devices, such as over the network(s) 1106 or directly. For example, communication interface(s) 1112 can enable communication through one or more network(s) 1106, which may include, but are not limited any type of network known in the art, such as a local area network or a wide area network, such as the Internet, and may include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 may include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 may include speakers, a microphone, a camera, and various user controls (e.g., affordances, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 may include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 may include sensor(s) 1118. The sensor(s) 1118 may include a GPS device able to indicate location information. Further, the sensor(s) 1118 may include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes.

As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1102 may include various other components that are not shown, examples of which include removable storage, a power source, such as a battery and power control unit, a barcode scanner, a printer, a cash drawer, and so forth.

In addition, in some examples, the user device 1102 may include, be connectable to, or otherwise be coupled to a reader device 1126, for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 may include a read head for reading a magnetic strip of a payment card, and further may include encryption technology for encrypting the information read from the magnetic strip. Additionally, or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her user device such as a smart phone running a payment service application over a payment reader to complete a transaction via short-range communication) to obtain payment data associated with a customer. Additionally, or optionally, the reader device 1126 may also include a biometric sensor to receive and process biometric characteristics and process them as payment instruments, given that such biometric characteristics are registered with the payment service and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 may include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 may include one or more processors 1128, one or more computer-readable media 1130, one or more I/O devices 1132, and one or more communication interfaces 1134. Each processor 1128 can be a single processing unit or a number of processing units, and may include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 may include volatile and nonvolatile memory and/or removable and non-removable media implemented in any type of technology for storage of information, such as computer-readable instructions, data structures, program components, or other data. Such computer-readable media 1130 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per sc.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider and/or payment processing service. Functional components stored in the computer-readable media 1130 can optionally include a merchant component 1136, a training component 1138, and one or more other components and data 1140.

The merchant component 1136 can be configured to receive transaction data from POS systems, such as the POS system 624 described above with reference to FIG. 6. The merchant component 1136 can transmit requests (e.g., authorization, capture, settlement, etc.) to payment service server computing device(s) to facilitate POS transactions between merchants and customers. The merchant component 1136 can communicate the successes or failures of the POS transactions to the POS systems.

The training component 1138 can be configured to train models using machine-learning mechanisms. For example, a machine-learning mechanism can analyze training data to train a data model that generates an output, which can be a recommendation, a score, and/or another indication. Machine-learning mechanisms may include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

The one or more other components and data 1140 may include a user interface component 1148, a balance management component 1152, a user account selection component 1154, an advance offer generating component 1156, a transactions component 1158, a training component 1160, other components and data 1162, or the like, the functionality of which is described, at least partially, above. Further, the one or more other components and data 1140 may include programs, drivers, etc., and the data used or generated by the functional components. Further, the server(s) 1104 may include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally, or alternatively, in some examples, the service provider can utilize an SDK to integrate third-party service provider functionality into its applications. That is, API(s) and/or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 may include one or more interfaces and hardware components for enabling communication with various other devices, such as over the network(s) 1106 or directly. For example, communication interface(s) 1134 can enable communication through one or more network(s) 1106, which may include, but are not limited any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1106 may include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 may include a display, various user interface controls (e.g., affordances, joystick, keyboard, mouse, touch screen, biometric or sensory input devices, etc.), audio speakers, connection ports and so forth. In at least one example, the system 1100 may include a datastore 1144 that can be configured to store data that is accessible, manageable, and updatable. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 may include multiple databases and/or servers connected locally and/or remotely via the network(s) 1106. In at least one example, the datastore 1144 can store user profiles, which may include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled)

appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and case of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Disclosed herein are the following clauses.

A. A payment service system associated with a payment service, the payment service system comprising one or more processors and a non-transitory computer-readable memory communicatively coupled with the one or more processors, wherein the memory comprises: a ledger recording ownership of amounts of funds by a plurality of users of the payment service, wherein a user of the plurality of users is assigned ownership of a restricted account associated with a restricted balance and ownership of an unrestricted account associated with an unrestricted balance, and wherein the restricted balance is associated with a condition; and instructions, which, when executed by the one or more processors, cause the one or more processors to perform operations, comprising, prior to satisfaction of the condition: receiving, from a user device associated with the user, a request to access an amount of the funds comprising the restricted balance; causing an intervention to be displayed by the user device that prevents access to the funds comprising the restricted balance; in lieu of accessing the funds in the restricted balance, automatically causing an amount of funds to be transferred to the unrestricted balance associated with the unrestricted account by increasing a value of the unrestricted balance in the ledger; and withdrawing, from the restricted balance, an amount of funds equal to the amount of funds transferred to the unrestricted balance unless at least one of a deposit or a repayment of the amount of funds transferred to the unrestricted balance is received within a designated repayment period.

B. The payment service system of clause A, wherein the withdrawn amount of funds comprises a loan amount, the operations further comprising: determining, using a machine-learning model trained to generate a recommendation of repayment terms for repaying loan amounts, and based on the amount of funds comprising the restricted balance, a set of repayment terms for repaying the loan amount; automatically updating the intervention displayed by the user device to include an offer for the loan amount and the set of repayment terms, wherein the set of repayment terms includes a collateral amount of the restricted balance; and receiving, from the user device, an indication of an acceptance of the offer, wherein automatically causing the amount of funds to be transferred to the unrestricted balance is based at least in part on having received the indication of the acceptance of the offer.

C. The payment service system of any of clauses A-B, further comprising training the machine-learning model by updating the machine-learning model based on receiving the acceptance of the offer.

D. The payment service system of any of clauses A-C, wherein automatically causing an amount of funds to be transferred to the unrestricted balance is based at least in part on adjusting the ledger to decrease a second unrestricted balance of a second unrestricted account by the amount of funds to be transferred to the unrestricted balance, wherein the second unrestricted account is owned by the payment service system.

E. A payment service system associated with a payment service, the payment service system comprising one or more processors and a non-transitory computer-readable memory communicatively coupled with the one or more processors, wherein the memory comprises: a plurality of accounts for a plurality of users of the payment service, comprising one or unrestricted accounts associated with unrestricted balances and one or more restricted accounts associated with one or more restricted balances, each associated with a condition that, upon satisfaction, allows the restricted balance to transition to an unrestricted balance; and instructions, which, when executed by the one or more processors, cause the one or more processors to perform operations, comprising: receiving, from a user device associated with a user of the payment service, a request to access an amount of the funds comprising a restricted balance associated with a restricted account of the user prior to satisfaction of the condition associated with the restricted account; causing an intervention to be displayed by the user device that prevents access to the funds comprising the restricted balance; in lieu of accessing the funds in the restricted balance, automatically causing an amount of funds to be transferred to an unrestricted account of the user; and withdrawing, from the restricted balance, an amount of funds equal to the amount of funds transferred to the unrestricted account unless one or more conditions associated with the transfer to the unrestricted account of the user are satisfied.

F. The payment service system of clause E, wherein the memory further comprises a ledger recording ownership by the plurality of users of the unrestricted accounts and associated unrestricted balances and restricted account and the restricted balances as associated amounts of funds.

G. The payment service system of any of clauses E-F, wherein automatically causing the amount of funds to be transferred to the unrestricted account of the user is based at least in part on adjusting the ledger to decrease a second unrestricted balance of a second unrestricted account by the amount of funds to be transferred to the unrestricted account.

H. The payment service system of clauses E-G, wherein the second unrestricted account is owned by the payment service system.

I. The payment service system of clauses E-H, wherein the second unrestricted account is owned by a second user of the plurality of users.

J. The payment service system of any of clauses F-I, wherein automatically causing an amount of funds to be transferred to the unrestricted account is based at least in part on adjusting the ledger to increase a second unrestricted balance recorded in the ledger by the amount of funds, wherein the user is assigned ownership of the second unrestricted balance by associating the second unrestricted balance with the unrestricted account of the user.

K. The payment service system any of clauses E-J, wherein the conditions associated with the transfer to the unrestricted account comprise: a deposit of a designated amount to the unrestricted account of the user within a designated period of time; or a repayment of at least some of the amount of funds transferred to the unrestricted account within a designated repayment period.

L. The payment service system any of clauses E-K, wherein the conditions associated with the restricted accounts comprise: an age of the restricted account; an age of the restricted balance associated with the restricted account; or an age of the user associated with the restricted account.

M. The payment service system any of clauses E-L, wherein the operations further comprise: determining the one or more conditions associated with the transfer to the unrestricted account using a machine-learning model trained to generate a recommendation of repayment terms and based on an amount of funds comprising the restricted balance; automatically updating the intervention displayed by the user device to include an offer for the transfer and the set of repayment terms, wherein the set of repayment terms includes a collateral amount of the restricted balance; and receiving, from the user device, an indication of an acceptance of the offer, wherein automatically causing the amount of funds to be transferred to the unrestricted account is based at least in part on having received the indication of the acceptance of the offer.

N. The payment service system of clauses E-M, further comprising training the machine-learning model by: accessing a transaction history and financial data associated with each of the plurality of users; inputting the transaction history and financial data into the machine-learning model to generate a plurality of recommendations of amounts of funds to be transferred to unrestricted balances and a plurality of respective conditions associated with the transfers; outputting, by the machine-learning model, the recommendations for acceptance or rejection; inputting the acceptance or rejection of each of the recommendations into the machine-learning model; and causing the machine-learning model to be updated based on the acceptance or rejection of each of the recommendations.

O. A method, implemented by a payment service system associated with a payment service, comprising: receiving, from a user device associated with a user of the payment service, a request to access an amount of the funds comprising a restricted balance associated with a restricted account of the user prior to satisfaction of a condition associated with the restricted account, wherein the condition, upon satisfaction, allows the restricted balance associated with the restricted account to transition to an unrestricted balance; causing an intervention to be displayed by the user device that prevents access to the funds comprising the restricted balance; in lieu of accessing the funds in the restricted balance, automatically causing an amount of funds to be transferred to an unrestricted account of the user; and withdrawing, from the restricted balance, an amount of funds equal to the amount of funds transferred to the unrestricted account unless one or more conditions associated with the transfer to the unrestricted account of the user are satisfied.

P. The method of clauses of O, further comprising accessing a ledger recording ownership by a plurality of users of the payment service of a plurality of unrestricted accounts and associated unrestricted balances and a plurality of restricted accounts and associated restricted balances as associated amounts of funds.

Q. The method of clauses O-P, wherein automatically causing the amount of funds to be transferred to the unrestricted account of the user is based at least in part on adjusting the ledger to decrease a second unrestricted balance of a second unrestricted account by the amount of funds to be transferred to the unrestricted account.

R. The method of clauses O-Q, wherein the second unrestricted account is owned by the payment service system.

S. The method of clauses O-R, wherein the second unrestricted account is owned by a second user of the plurality of users.

T. The method of clauses P-S, wherein automatically causing an amount of funds to be transferred to the unrestricted account is based at least in part on adjusting the ledger to increase a second unrestricted balance recorded in the ledger by the amount of funds, wherein the user is assigned ownership of the second unrestricted balance by associating the second unrestricted balance with the unrestricted account of the user.

What is claimed is:

1. A payment service system associated with a payment service, the payment service system comprising one or more processors and a non-transitory computer-readable memory communicatively coupled with the one or more processors, wherein the non-transitory computer-readable memory comprises:

a ledger recording ownership of amounts of funds by a plurality of users of the payment service, wherein a user of the plurality of users is assigned ownership of one or more accounts associated with one or more financial service providers, including at least a restricted account associated with a restricted balance and an unrestricted account associated with an unrestricted balance, and wherein the restricted balance is associated with a condition, wherein the condition is associated with imposition of penalties on the user unless the condition is satisfied prior to the user requesting access to the restricted balance;

an interactive user interface of a user device configured to facilitate access to restricted funds associated with the user of the plurality of users; and instructions, which, when executed by the one or more processors, cause the one or more processors to perform operations, comprising, prior to satisfaction of the condition:

receiving, from the user device associated with the user, a first interaction with the interactive user interface indicating a request to access an amount of funds comprising the restricted balance, wherein the user device executes an instance of an application associated with the payment service;

displaying, on the interactive user interface, an intervention notification, wherein the intervention notification includes a warning that indicates that a penalty is associated with access to the funds comprising the restricted balance, and wherein the intervention notification includes an interactive element that triggers an access request to generate alternative processes for accessing the amount;

analyzing, in response to a second interaction with the interactive user interface and the interactive element, the one or more accounts and the one or more financial service providers associated with the user to identify respective conditions applicable to the request to access the amount of funds;

processing, based on the respective conditions applicable to the request, ledger data and the ledger and characteristics of the user in real-time using a trained machine learning model to generate personalized recommendations for the alternative processes for accessing the amount through the one or more accounts that reduces financial penalties on the user, the trained machine learning model having been trained using training data associated with a plurality of different users of the payment service system;

presenting, on the interactive user interface, the generated personalized recommendations, wherein at least one of the generated personalized recommendations is indicated as a preferred personalized recommendation based on one or more goals associated with the user;

receiving, from the user device, a third interaction with the interactive user interface indicating an alternative request, wherein the alternative request is associated with a selected recommendation of the generated personalized recommendations;

automatically causing, based on the alternative request, the amount to be transferred to the unrestricted balance associated with the unrestricted account by increasing a value of the unrestricted balance in the ledger; and analyzing the alternative request and a transaction history of the user using the trained machine learning model to generate a set of custom repayment terms associated with the alternative request, wherein the set of custom repayment terms include a scheduled withdrawal of an outstanding amount from the restricted balance responsive to a failure of the user device to comply with the set of custom repayment terms.

2. The payment service system of claim 1, wherein the amount comprises a loan amount, the operations further comprising:

automatically updating the intervention notification displayed by the interactive user interface to include an offer for the loan amount and the set of custom repayment terms, wherein the set of custom repayment terms includes a collateral amount of the restricted balance; and receiving, from the user device, a fourth interaction with the interactive user interface indicating an acceptance of the offer, wherein automatically causing the amount to be transferred to the unrestricted balance is based at least in part on having received the acceptance of the offer.

3. The payment service system of claim 2, further comprising updating the trained machine learning model by further training the trained machine learning model based on receiving the acceptance of the offer.

4. The payment service system of claim 1, wherein automatically causing the amount to be transferred to the unrestricted balance is based at least in part on adjusting the ledger to decrease a second unrestricted balance of a second unrestricted account by the amount to be transferred to the unrestricted balance, wherein the second unrestricted account is owned by the payment service system.

5. A payment service system associated with a payment service, the payment service system comprising one or more processors and a non-transitory computer-readable memory communicatively coupled with the one or more processors, wherein the non-transitory computer-readable memory comprises:

a plurality of accounts for a plurality of users of the payment service, comprising one or more unrestricted accounts associated with unrestricted balances and one or more restricted accounts associated with restricted balances, wherein a user of the plurality of users is assigned ownership of one or more accounts associated with one or more financial service providers, wherein each restricted account is associated with a condition that, upon satisfaction, allows a restricted balance to transition to an unrestricted balance, and wherein the condition is associated with imposition of penalties unless the condition is satisfied prior to the user requesting access to the restricted balance;

an interactive user interface of a user device configured to facilitate access to restricted funds associated with the user of the plurality of users; and instructions, which, when executed by the one or more processors, cause the one or more processors to perform operations, comprising:

receiving, from the user device associated with the user of the payment service, a first interaction with the interactive user interface indicating a request to access an amount of funds comprising a restricted balance associated with a restricted account of the one or more accounts of the user prior to satisfaction of the condition associated with the restricted account, wherein the user device executes an instance of an application associated with the payment service;

displaying, on the interactive user interface, an intervention notification, wherein the intervention notification includes a warning that indicates that a penalty is associated with access to the funds comprising the restricted balance, and wherein the intervention notification includes an interactive element that triggers an access request to generate alternative processes for accessing the amount;

analyzing, in response to a second interaction with the interactive user interface and the interactive element, the one or more accounts and the one or more financial service providers associated with the user to identify respective conditions applicable to the request to access the amount of funds;

processing, based on the respective conditions applicable to the request, the one or more accounts associated with the user and characteristics of the user in real-time using a trained machine learning model to generate personalized recommendations for the alternative processes for accessing the amount through the one or more accounts that reduces financial penalties on the user, the trained machine learning model having been trained using training data associated with the plurality of users;

presenting, on the interactive user interface, the generated personalized recommendations, wherein at least one of the generated personalized recommendations is indicated as a preferred personalized recommendation based on one or more goals associated with the user;

receiving, from the user device, a third interaction with the interactive user interface indicating an alternative request, wherein the alternative request is associated with a selected recommendation of the generated personalized recommendations;

automatically causing, based on the alternative request, the amount to be transferred to an unrestricted account of the user; and analyzing the alternative request and historical transactions of the user using the trained machine learning model to generate a set of custom repayment terms associated with the alternative request, wherein the set of custom repayment terms include a scheduled withdrawal of an outstanding amount from the restricted balance responsive to a failure of the user device to comply with the set of custom repayment terms.

6. The payment service system of claim 5, wherein the non-transitory computer-readable memory further comprises a ledger recording ownership by the plurality of users of the one or more unrestricted accounts and associated unrestricted balances and the one or more restricted accounts and the associated restricted balances as associated amounts of funds.

7. The payment service system of claim 6, wherein automatically causing the amount to be transferred to the unrestricted account of the user is based at least in part on adjusting the ledger to decrease a second unrestricted balance of a second unrestricted account by the amount to be transferred to the unrestricted account.

8. The payment service system of claim 7, wherein the second unrestricted account is owned by the payment service system.

9. The payment service system of claim 7, wherein the second unrestricted account is owned by a second user of the plurality of users.

10. The payment service system of claim 6, wherein automatically causing the amount to be transferred to the unrestricted account is based at least in part on adjusting the ledger to increase a second unrestricted balance recorded in the ledger by the amount, wherein the user is assigned ownership of the second unrestricted balance by associating the second unrestricted balance with the unrestricted account of the user.

11. The payment service system of claim 5, wherein the set of custom repayment terms associated with the alternative request comprise:

a deposit of a designated amount to the unrestricted account of the user within a designated period of time; or a repayment of at least some of the amount transferred to the unrestricted account within a designated repayment period.

12. The payment service system of claim 5, wherein the condition comprises:

an account age of the restricted account;

a balance age of the restricted balance associated with the restricted account; or a user age of the user associated with the restricted account.

13. The payment service system of claim 5, wherein the operations further comprise:

automatically updating the intervention notification displayed by the interactive user interface to include an offer for a transfer of the amount to the unrestricted account of the user and the set of custom repayment terms, wherein the set of custom repayment terms includes a collateral amount of the restricted balance; and receiving, from the user device, a second user interaction with the interactive user interface indicating an acceptance of the offer, wherein automatically causing the amount to be transferred to the unrestricted account is based at least in part on having received the second user interaction indicating of the acceptance of the offer.

14. The payment service system of claim 13, further comprising training the trained machine learning model by:

accessing a transaction history and financial data associated with each of the plurality of users;

processing the transaction history and the financial data using the trained machine learning model to generate the personalized recommendations for the alternative processes for accessing the amount and respective conditions associated with the alternative processes;

outputting, by the trained machine learning model, the personalized recommendations for acceptance or rejection;

inputting the acceptance or rejection of each of the personalized recommendations into the trained machine learning model; and causing the trained machine learning model to be updated based on the acceptance or rejection of each of the personalized recommendations.

15. A method, implemented by a payment service system associated with a payment service, comprising:

receiving, from a user device associated with a user of the payment service, a first interaction with an interactive user interface indicating a request to access an amount of funds comprising a restricted balance associated with a restricted account of the user prior to satisfaction of a condition associated with the restricted account, wherein the user device executes an instance of an application associated with the payment service, wherein the user of the payment service is assigned ownership of one or more accounts, including at least the restricted account, associated with one or more financial service providers, wherein the condition, upon satisfaction, allows the restricted balance associated with the restricted account to transition to an unrestricted balance, and wherein the condition is associated with imposition of penalties unless the condition is satisfied prior to a request to access the restricted balance;

displaying, on the interactive user interface of the user device configured to facilitate access to restricted funds, an intervention notification, wherein the intervention notification includes a warning that indicates that a penalty is associated with access to the funds comprising the restricted balance, and wherein the intervention notification includes an interactive element that triggers an access request to generate alternative processes for accessing the amount;

analyzing, in response to a second interaction with the interactive user interface and the interactive element, the one or more accounts and the one or more financial service providers associated with the user to identify respective conditions applicable to the request to access the amount of funds;

processing, based on the respective conditions applicable to the request, the one or more accounts associated with the user and characteristics of the user in real-time using a trained machine learning model to generate personalized recommendations for the alternative processes for accessing the amount through the one or more accounts that reduces financial penalties on the user, the trained machine learning model having been trained using training data associated with a plurality of different users of the payment service system;

presenting, on the interactive user interface, the generated personalized recommendations, wherein at least one of the generated personalized recommendations is indicated as a preferred personalized recommendation based on one or more goals associated with the user;

receiving, from the user device, a third interaction with the interactive user interface indicating an alternative request, wherein the alternative request is associated with a selected recommendation of the generated personalized recommendations;

automatically causing, based on the alternative request, the amount to be transferred to an unrestricted account of the user; and analyzing the alternative request and a transaction history of the user using the trained machine learning model to generate a set of custom repayment terms associated with the alternative request, wherein the set of custom repayment terms include a scheduled withdrawal of an outstanding amount from the restricted balance responsive to a failure of the user device to comply with the set of custom repayment terms.

16. The method of claim 15, further comprising accessing a ledger recording ownership by a plurality of users of the payment service of a plurality of unrestricted accounts and associated unrestricted balances and a plurality of restricted accounts and associated restricted balances as associated amounts of funds.

17. The method of claim 16, wherein automatically causing the amount to be transferred to the unrestricted account of the user is based at least in part on adjusting the ledger to decrease a second unrestricted balance of a second unrestricted account by the amount to be transferred to the unrestricted account.

18. The method of claim 17, wherein the second unrestricted account is owned by the payment service system.

19. The method of claim 17, wherein the second unrestricted account is owned by a second user of the plurality of users.

20. The method of claim 16, wherein automatically causing the amount to be transferred to the unrestricted account is based at least in part on adjusting the ledger to increase a second unrestricted balance recorded in the ledger by the amount of funds, wherein the user is assigned ownership of the second unrestricted balance by associating the second unrestricted balance with the unrestricted account of the user.

* * * * *